US011656868B1

(12) United States Patent
Gottlob et al.

(10) Patent No.: US 11,656,868 B1
(45) Date of Patent: May 23, 2023

(54) SYSTEM AND METHOD FOR TRANSLATING EXISTENTIAL DATALOG INTO DIFFERENTIAL DATAFLOW

(71) Applicant: Meltwater News International Holdings GmbH, Schaffhausen (CH)

(72) Inventors: Georg Gottlob, Oxford (GB); Aditya Jami, San Francisco, CA (US); Lukas Schweizer, Dresden (DE)

(73) Assignee: MELTWATER NEWS INTERNATIONAL HOLDINGS GMBH, Schaffausen (CH)

( * ) Notice: Subject to any disclaimer, the term of this patent is extended or adjusted under 35 U.S.C. 154(b) by 0 days.

(21) Appl. No.: 17/967,433

(22) Filed: Oct. 17, 2022

(51) Int. Cl.
*G06F 8/72* (2018.01)
*G06F 8/30* (2018.01)

(52) U.S. Cl.
CPC . *G06F 8/72* (2013.01); *G06F 8/30* (2013.01)

(58) Field of Classification Search
CPC .................................. G06F 8/72; G06F 8/30
See application file for complete search history.

(56) References Cited

U.S. PATENT DOCUMENTS

| 9,165,035 | B2 | 10/2015 | McSherry | |
|---|---|---|---|---|
| 2008/0120348 | A1* | 5/2008 | Field | G06F 8/31 |
| 2009/0177640 | A1* | 7/2009 | Verbaere | G06F 16/2425 |

OTHER PUBLICATIONS

Gottlob et al., "Query Rewriting and Optimization for Ontological Databases" (Year: 2014).*
Elnar Hajiyev, "CodeQuest—Source Code Querying with Datalog" (Year: 2005).*
Pacak et al., "Functional Programming with Datalog" (Year: 2012).*
Sereni et al., "Adding Magic to an Optimising Datalog Compiler" (Year: 2008).*
Marc T. Friedman, "Representation and Optimization for Data Integration" (Year: 1999).*
Bertossi et al. "Datalog: Bag Semantics via Set Semantics". 22nd International Conference on Database Theory, ICDT 2019, Mar. 26-28, 2019, Lisbon, Portugal. vol. 127. LIPIcs. Schloss Dagstuhl—Leibniz-Zentrum für Informatik, 2019, 16:1-16:19. doi: 10.4230/LIPIcs.ICDT.2019.16. url: https://doi.org/10.4230/LIPIcs.ICDT.2019. 16.
Baget et al. "Extending decidable cases for rules with existential variables". Twenty-First International Joint Conference on Artificial Intelligence 2009.
Baget et al. "Walking the Decidability Line for Rules with Existential Variables." KR 10 (2010), pp. 466-476.
Cali et al. "Taming the Infinite Chase: Query Answering under Expressive Relational Constraints". Journal of Artificial Intelligence Research (JAIR) 48 (2013), pp. 115-174.
Cali et al. "A general Datalog-based framework for tractable query answering over ontologies". Journal of Web Semantics 14 (2012), pp. 57-83.

(Continued)

*Primary Examiner* — Phillip H Nguyen
(74) *Attorney, Agent, or Firm* — Fresh IP PLC; Clifford D. Hyra; John R. Bednarz

(57) ABSTRACT

The present disclosure comprises systems and methods to convert Existential Datalog source code into Differential Dataflow source code, whereby databases or knowledge graphs, some of whose relations are defined from other relations using Existential Datalog rules can be maintained incrementally.

22 Claims, 8 Drawing Sheets

(56) References Cited

OTHER PUBLICATIONS

Cali et al. "Datalog+/−: A Family of Logical Knowledge Representation and Query Languages for New Applications (invited paper)". In: LICS—ACM/IEEE Symposium on Logic in Computer Science. IEEE Computer Society, 2010, pp. 228-242.
Bellomarini et al. "The Vadalog System: Datalog-based Reasoning for Knowledge Graphs". In: Proceedings of the VLDB Endowment (PVLDB) 11.9 (2018), pp. 975-987.
Bellomarini et al. "Swift Logic for Big Data and Knowledge Graphs". In: IJCAL 2017.
Bellomarini et al. "Vadalog: A modern architecture for automated reasoning with large knowledge graphs". In Information Systems (2020), p. 101528.
Mcsherry et al. "Differential Dataflow". In: CIDR. 2013.
Abadi et al. "Foundations of differential dataflow". In: International Conference on Foundations of Software Science and Computation Structures Springer 2015, pp. 71-83.
Murray et al. "Incremental, iterative data processing with timely dataflow". Communications of the ACM 59.10 (2016), pp. 75-83.
Ryzhyk et al. "Differential Datalog". In: Datalog 2.0 2019—3rd International Workshop on the Resurgence of Datalog in Academia and Industry co-located with the 15th International Conference on Logic Programming and Nonmonotonic Reasoning (LPNMR 2019) at the Philadelphia Logic Week 2019, Philadelphia, PA (USA), Jun. 4-5, 2019. vol. 2368. CEUR Workshop Proceedings. CEUR-WS.org, 2019, pp. 56-67. url: http://ceur-ws.org/Vol-2368/paper6.pdf.
Mcsherry. "Differential Dataflow in Rust". In: URL: https:// crates.io/ crates/differential-dataflow (visited on Aug. 10, 2022), 2018.
Schweizer. "Deltalog (incomplete Draft Paper)". URL: https://docs.google.com/document/d/ 1INDSsGuHoSRxkji13JHePB36Kqv0fArjiizF-6jfjc4 /edit#heading=h.t1li72iwnmw6 (visited on Aug. 10, 2022) (2021).
Goebel, "Optimising Distributed Dataflows in Interactive Environments (Master's Thesis)". MA thesis. ETH Zurich, Computer Science Department, 2019.
"Differential Dataflow (Online Handbook)". URL:https://timelydataflow.github.io/ differential-dataflow/introduction.html visited on Aug. 10, 2022 (2021).
Gottlob, et al. "Consistency Checking of Reengineered UML Class Diagrams via Datalog+/−". In: RuleML—International Web Rule Symposium. vol. 9202. Lecture Notes in Computer Science Springer, 2015, pp. 35-53.
Arenas et al. "Expressive Languages for Querying the Semantic Web". In: ACM Transactions on Database Systems (TODS) 43.3 (2018), 13:1-13:45.
"Vadalog User Manual—Vadalog Version 1.0.0". In: DeepReason.ai (Apr. 2021). url: https://www.dropbox.com/s/0hlncfw1supvyj6/vadalog_manual.pdf?dl=0.
Chothia et al. "Explaining Outputs in Modern Data Analytics". In: Proceedings of the VLDB Endowment 9.12 (2016).

* cited by examiner $\rho$    `labeled(X,Y,$Z) :- connection(X,Y);`    705

705    710    715

$T(\rho) = T_{reg}(\rho) \, T_{head}(\rho)$    720

$T_{reg}(\rho)$    `connection_recursive_var`    725

$T_{head}(\rho)$

```
.map(move |(q1, q2)|
{
    let value = null_counter;
    null_counter = value + 1;
    let arg1 = q1;
    let arg2 = q2;
    let arg3 = format!("null_{}", value + 1 - 1);
    return (arg1, arg2, arg3);
})
```
730

Fig. 7    700

SYSTEM AND METHOD FOR TRANSLATING EXISTENTIAL DATALOG INTO DIFFERENTIAL DATAFLOW

FIELD

The subject application relates generally to data management, and, for example, to the efficient update of data relations or views that are defined by logic programming rules formulated in Existential Datalog, where the data relations or views are, for example, stored in databases or knowledge graphs. The subject application also relates to stream data processing and to the translation of rule-based database programming languages into the general-purpose framework of Differential Dataflow.

BACKGROUND

Datalog Translations into Differential Dataflow

There are a number of flawed conventional solutions as noted below.

Subsequently listed systems do all use differential dataflow as lower level computing machinery, but do not support existentially quantified variables in rule heads.

- Clockworks Declarative Dataflow: is a system which translates a Datalog like input language into differential dataflow dynamically at runtime, thus realizes an interpreter approach. It does not support existentially quantified variables.
- VMWware Differential Datalog: is a system that translates a Datalog like query input language into a Rust program which realizes the query using differential dataflow. VMWare's Differential Datalog does not allow for existentially quantified variables, but offers a rich query language targeted towards applications running on network infrastructure devices.
- Materialize.io: is a system that translates SQL (SQL92 Standard) queries dynamically at runtime. Due to the restriction of accepting SQL queries only, the input language does not support recursive queries which makes it less suitable for knowledge graph application scenarios. Moreover, SQL does not support existentially quantified variables.

Other Datalog Implementations

The following systems are an incomplete list of well-known datalog query engines, which do not rely on differential dataflow.

- Soufflé is a system which compiles datalog queries into native C code—therefore the entire evaluation logic is implemented in C, and small executable programs are the result of this translation. Soufflé was designed to have datalog query capabilities available on (small) embedded computing devices with limited computing resources.
- Vlog is a datalog query engine applying a novel data storing approach, where in contrast to traditional row based data structures, records are maintained in a column oriented way. This allows very fast implementations of join algorithms. Vlog does also support existentially quantified variables, but lacks incremental or differential behaviour, and is implemented in C.
- RDFox is datalog query engine directly supporting so-called RDF (Resource Description Framework) graphs. It further supports parallel reasoning, and highly optimized in memory query evaluation. RDFox is implemented in C.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

In one example, a method of converting Existential Datalog source code P into Differential Dataflow source code may include accessing, by at least one processor, Existential Datalog source code P from one of electronic storage and via user input, and converting, by the at least one processor, the Existential Datalog source code P into code of a target language augmented by Differential Dataflow constructs and operators, the converting producing code that, when executed on an extensional database D determines "Chase (D,P)" of a fair Chase procedure to D and P, thereby determining a materialization of a knowledge graph (D,P) formed by D and P, whereby, upon a normal termination of a computation of Trans(P) on input D, the determined Chase(D,P) enables a computation of solutions to (i) instances of the Query of Tuple problem (ii) instances of the Conjunctive Query Answering problem, and (iii) instances of the Certain Tuple Computation Problem.

In another example, a system to convert Existential Datalog source code P into Differential Dataflow source code includes a memory storing computer-readable instructions and at least one processor to execute the instructions to access Existential Datalog source code P from one of electronic storage and via user input, and convert the Existential Datalog source code P into code of a target language augmented by Differential Dataflow constructs and operators, to produce code that, when executed on an extensional database D determines "Chase(D,P)" of a fair Chase procedure to D and P, and determines a materialization of a knowledge graph (D,P) formed by D and P, whereby, upon a normal termination of a computation of Trans(P) on input D, the determined Chase(D,P) enables a computation of solutions to (i) instances of the Query of Tuple problem (ii) instances of the Conjunctive Query Answering problem, and (iii) instances of the Certain Tuple Computation Problem.

As another example, a non-transitory computer-readable storage medium includes instructions stored thereon that, when executed by a computing device cause the computing device to perform operations of converting Existential Datalog source code P into Differential Dataflow source code, the operations including accessing Existential Datalog source code P from one of electronic storage and via user input, and converting the Existential Datalog source code P into code of a target language augmented by Differential Dataflow constructs and operators, the converting producing code that, when executed on an extensional database D determines "Chase(D,P)" of a fair Chase procedure to D and P, thereby determining a materialization of a knowledge graph (D,P) formed by D and P, whereby, upon a normal termination of a computation of Trans(P) on input D, the determined Chase(D,P) enables a computation of solutions to (i) instances of the Query of Tuple problem (ii) instances of the Conjunctive Query Answering problem, and (iii) instances of the Certain Tuple Computation Problem.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 7 is an example of the core translation of some EE-Deltalog rule which contains an existentially quantified variable according to an example of the instant disclosure.

DETAILED DESCRIPTION

Figure 1:
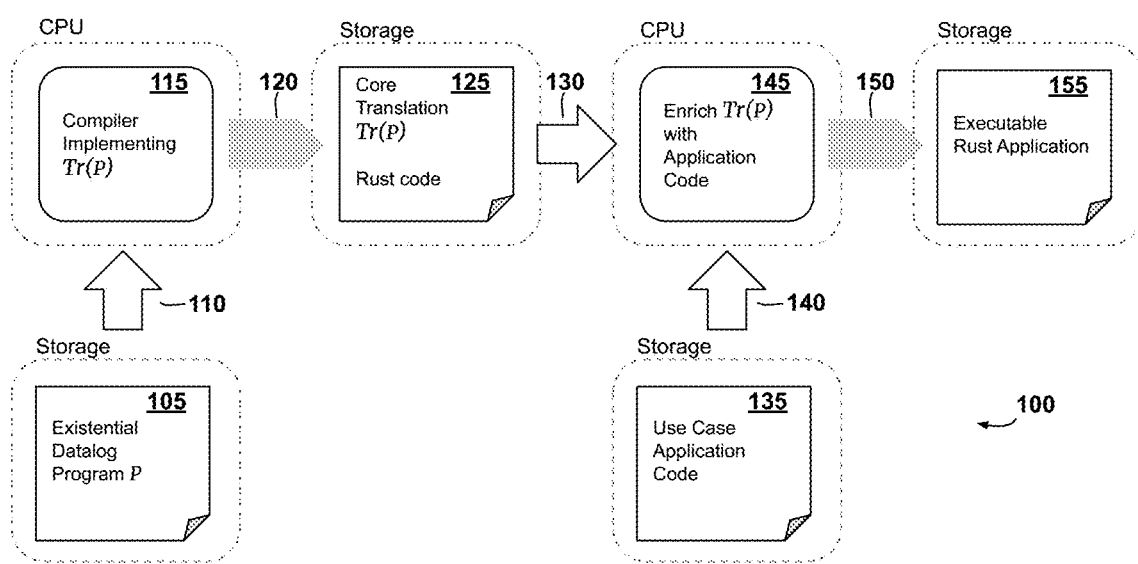
FIG. 1 is an overview of components of the essential translation of an EE-Deltalog program according to an example of the instant disclosure.

This disclosure discusses translating and converting Existential Datalog programs and associated source code into Differential Dataflow code. This comes with huge advantages combining the already described advantages of Existential Datalog with those mentioned for Differential Dataflow.

Datalog

Datalog is a rule-based logical query and programming language whose rules (in the basic version) syntactically correspond to universally quantified function-free Horn clauses. Datalog is a language tailored for relational databases and assumes an extensional database (EDB), for example, an enterprise database or knowledge graph, whose tables correspond to so-called EDB predicates. The EDB can also be supplied as an input stream of data tuples, or as a sequence of INSERT, DELETE, and some times also UPDATE commands, whose combined effect a given moment in time determines the current content (or current state) of the EDB. There are various other methods for supplying an EDB.

From an EDB, a Datalog program P computes an intensional database (IDB), which consists of relational instances of the so-called IDB predicate symbols in the program. For example, if "parent" is a binary EDB relation where "parent (X,Y)" expresses that X is a parent of Y, then the following Datalog program computes the IDB relation "ancestor", which is the transitive closure of the parent relation. Here the ancestor IDB relation is also called an IDB predicate, and the name "ancestor" is an IDB predicate symbol. When the meaning is clear from the context, sometimes, a predicate symbol is simply referred to as "predicate".

ancestor(X,Y):—parent(X,Y);
ancestor(X,Z):—parent(X,Y) ancestor(Y,Z);

Datalog programs consist of rules such as the two above rules, which are here stated in Prolog-style notation. Datalog in general does not have a standardized syntax. We will use Prolog-style notation for Datalog and its extensions throughout this disclosure. However, there are various syntactic alternatives for writing down rules and programs in Datalog and its extensions. The choice of Prolog-style syntax is not intended to define or limit the scope of the disclosure.

Syntactically, the program corresponds to a conjunction of its two rules, and each rule corresponds to a first-order logic sentence. For example, the second rule is a syntactic equivalent of the first-order logic sentence $\forall X \forall Y \forall Z ((parent(X, Y) \wedge ancestor(Y, Z)) \rightarrow ancestor(X, Z)))$.

However, semantically, Datalog transcends first-order logic as, for example, the transitive closure of a relation (rather than its transitivity) is not first-order definable.

Each rule of a Datalog program has a rule head, which consists of an atom, and a rule body, which consists of a comma-separated list of atoms indicating their conjunction. An atom has a predicate symbol and arguments. Each variable that appears in a rule head must also appear in the body of the same rule. In the most basic version of Datalog, the predicate symbol of a Datalog atom is the name of an EDB or IDB relation, and the atom's arguments are variables. In other versions, comparison atoms such as, for example X<Y are admitted in rule bodies, and in some versions, arguments can also be data constants of various types, for example, numerical values. An atom whose predicate is the name of an EDB relation is an EDB-atom and its predicate is referred to as EDB-predicate. An atom whose predicate is not the name of any EDB relation is an IDB atom, and its predicate is referred to as IDB predicate. A Datalog program computes an IDB from its input EDB. The IDB contains a data relation (an IDB relation) for each IDB predicate. In the context of Datalog, one identifies a tuple of a relation with a ground atom (also "ground fact"). A ground atom is an atom whose arguments are all data values (and not variables). For example if "ancestor" is a relation containing the tuple "(adam,delila)", then this tuple corresponds to the ground atom "ancestor(adam,delila)". Vice-versa, a set of ground atoms can always be seen as a set of relations, one for each predicate name. Note: If the same predicate name occurs in a Datalog program with different arities then, for each of these arities, this name corresponds to a separate relation.

In the context of Datalog, Herbrand interpretations are sets of ground atoms whose predicate symbols are EDB or IDB predicate symbols, and whose arguments range over the finite set of data elements in the EDB and in the program. This set of elements is also called the active domain, or the Herbrand universe HU(D,P) of D and P. Atoms whose predicate is a an EDB or IDB predicate of a Datalog program P are called ground atoms (w.r.t. D and P), and the set of all such ground atoms is referred to as the Herbrand Base HB(D,P) of D and P.

The standard semantics of Datalog singles out a unique "designated" (also "preferred") Herbrand interpretation for a given program P with a given EDB D. This designated interpretation, which contains D as subset, is the unique minimal model of $P^* \wedge D^*$ where $P^*$ denotes the syntactical logical equivalent of a Datalog program P, as explained above, and where $D^*$ is the conjunction of all ground atoms in D. It is well-known that this designated interpretation can be formulated in second-order logic and in fixed-point logic, and can be obtained via a least-fixed-point computation that applies the rules of P to D iteratively, starting from D and an empty IDB, and successively deriving further ground atoms, i.e., atoms of atoms from HB(D,P), and adding them to the IDB until no further ground atom can be derived. If the program P is considered as a monotonic transformation that adds zero or more facts to an interpretation, then D plus all new atoms added is indeed the least fixed point of this transformation. A rule ρ of P may be applied via a ground substitution θ, that is, a substitution that uniformly replaces the variables in the body body(ρ) of ρ by elements from HU(D,P). A rule ρ of P is applicable via θ if for each atom A of body(ρ), the result θ(A) of applying θ to A is either in D or has already been derived through a previous rule application. A rule ρ is unsatisfied if it is applicable, but θ(head(ρ)) is neither in D nor has been derived in previous steps, and where θ(head(ρ)) is not in the intermediate IDB build so far. Such an unsatisfied rule is "applied" or "fired" with θ by adding the new ground atom θ(head(ρ)) to the IDB computed so far. The final result IDB for program P and database D can be computed by repeatedly and exhaustively identifying rules ρ that are unsatisfied with some ground substitution θ, and then applying ρ with θ. It is well-known that the IDB IDB(D,P) computed by this process is uniquely defined and independent of the order of rule application, and that D∪IDB(D,P) is precisely the above mentioned unique designated Herbrand interpretation.

A equivalent way of defining the semantics of Datalog is via first-order entailment (well-known not to be first-order definable): Let p be an EDB predicate and D an EDB. Then a ground atom γ of the form $p(t_1, \ldots, t_n)$ is in the designated model of P and EDB iff $P^* \wedge D^*$ logically entails γ.

In basic versions of Datalog, the EDB is read-only, which means that EDB-predicates are not allowed to appear in rule heads. However, versions of Datalog have been defined, where the EDB itself can be augmented or updated. For example, in order to express description logics, versions of (possibly extended) Datalog are used that are able to infer new EDB ground facts, and thus insert new tuples into the EDB.

In database terminology, a Datalog program P is a (possibly recursive) view-defining query, that associates IDB(D, P) to each given EDB D, and where the IDB(D,P) constitutes a view of the EDB.

Datalog has been extended by various features, some of which are discussed below. One important feature is negation in rule bodies. Here a safety condition is usually imposed: each variable of a negated atom also needs to occur in a positive atom of the same rule body. There are various types of negation with different semantics. The best known and most used type of negation in the database context is stratified negation.

The Dependency graph DG(P) of a (possibly extended) Datalog program P is the directed graph whose vertices are the predicate symbols occurring in P (annotated with their arity in case of a same predicate symbol occurs with multiple arities) and whose arcs are defined as follows. There is an arc between p and q if p is the predicate of the head atom of some clause of P, and q is the predicate of some atom occurring in the body of the same clause. Moreover, this arc between p and q is labeled, say, by an asterisk "*", if q is the predicate of a negated atom in a rule body whose head predicate is p. A predicate p of a Datalog program P depends negatively on a predicate q if there is a path from p to q in DG(P). A predicate p of a Datalog program P depends negatively on a predicate q if there is a path from p to q in DG(P) having at least one labelled edge.

A predicate p of P is recursive if p lies on a cycle in DG(P), otherwise, p is non-recursive. A (possibly extended) Datalog program P is stratified if no cycle of DG(P) contains a labeled edge. A stratified program, can be partitioned into a linearly ordered set of strata, where, starting from stratum 1 each further stratum is assigned a consecutive number. For each IDB predicate p, the rules whose head predicate is p are all in the same stratum, which is referred to as the "stratum of p" and here denoted by "stratum(p)", and if p depends on q, then stratum(p)≥stratum(q), and if p depends negatively on q, then stratum(p)>stratum(q). A stratification of a (possibly extended) stratified Datalog program can be obtained, for example, as follows. Collect into stratum 1 each rule whose head predicates does not negatively depend on any IDB predicate of P; moreover, if stratum i has been defined, and there are rules left, collect into stratum i+1 all rules whose head predicates depend only on predicates belonging to strata 1 . . . i. The IDB defined by a stratified program P over a database D can then be computed "bottom up" by applying the rules of P stratum by stratum from the lowest to the highest stratum. With each stratum i, an IDB $IDB_i$ is computed, where, for i≥j, $IDB_i \supseteq IDB_j$. Assume P has k strata $P_1, \ldots P_k$. Let $IDB_0$ designate the EDB D. A rule ρ of a stratified datalog program P is applicable with a ground substitution θ to a Herbrand interpretation I if (1) for each unnegated atom A in the body of ρ, θ(A)∈I and (2) for each negative literal "not A" in the rule body, θ(A) is not in I. Moreover, ρ is unsatisfied with θ if ρ with θ is applicable to I, but θ(head(ρ))∉I. The "application" or "firing" of an applicable unsatisfied rule ρ with a ground substitution θ on a Herbrand interpretation I adds the ground atom θ(head(ρ)) to I. For each i with 1≤i≤k, $IDB_i$ is computed from $IDB_{i-1}$ as follows. Starting with $IDB_{i-1}$, construct $IDB_i$ by repeatedly and exhaustively identifying rules ρ of P, that are unsatisfied with some ground substitution θ, and then apply ρ with θ. Note that for a negation-free (that is, plain) Datalog program P, this procedure precisely computes D∪IDB(D,P). For programs with negations in rule bodies, the procedure computes the single "designated" (or "preferred") Herbrand interpretation D∪IDB(D,P), which is a model of $P^* \wedge D^*$, where $P^*$ defined as for plain Datalog, except that, in addition, "not" is translated into the logical negation "¬".

Existential Rules and Existential Datalog

Note that the term "Existential Datalog" has multiple meanings in the literature. In the present disclosure it means Datalog extended by the possibility of using existential rules. An existential rule is a rule having existentially quantified variables in its head. By this definition, Existential Datalog generalizes plain Datalog. Note that in the context of database theory, existential rules are often referred to as "tuple-generating dependencies (TGDs)".

The Herbrand Universe HU(D,P) and Herbrand Base HB(D,P) for a database D and an Existential Datalog program P are defined in exactly the same way as for plain Datalog. In the same way as plain Datalog, Existential Datalog can be extended by stratified negation. The notions of dependency graph DG(P) and of stratified negation carry over from Datalog to the more general language of Existential Datalog.

While plain Datalog (even when extended by stratified negation) cannot express certain ontological reasoning tasks, such tasks can be expressed in Existential Datalog. For example the DL-Lite description logic axiom house⊓ ¬isolated ⊑ ∃neighbor_property which expresses that to a house that is not isolated, there must exist a neighboring property. This can be rephrased in Existential Datalog (here also using stratified negation) as:

neighbor_property(X,Y):—house(X), not isolated (X)

In this example, house and isolated are EDB relations. From these, the IDB relation neighbor_property is created. The Y variable in the rule head is to be understood as existentially quantified. Generally, all variables that appear in the head but not in the body of a rule are to be considered existentially quantified. In specific versions of existential Datalog, such as in Elementary Existential Datalog (to be defined below), for better readability, all existential variables are required to start with a $ sign. The head of the above rule would thus be "neighbor_property(X,$Y)".

The logical formula syntactically corresponding to an existential rule is an implication as above, where, all body variables are universally quantified and where all existential variables, i.e., those appearing in the head but not in the body are existentially quantified. The above rule thus corresponds to the logical sentence:

∀x ((house(x)∧¬isolated(x))→∃y neighbor_property(x, y)).

The logical formula P*, syntactically corresponding to an existential (and possibly stratified) Datalog program P, is the conjunction of the logical correspondents of its clauses.

For Existential Datalog, three relevant problems are considered: (1) the query-of-tuple (QOT) problem, (2) the conjunctive query (CQ) answering problem, which generalizes the QOT-problem, and (3) the certain-tuple computation problem. These problems are logically defined as follows The QOT Problem. An instance (D,P,γ) of the QOT problem consists of an EDB D, an Existential Datalog program P and a ground atom γ∈EHU(D,P), sometimes also referred to as "goal". The problem is to determine whether γ is a logical consequence of D*∧P*.

The CQ Answering Problem. An instance (D,P,Q) of the CQ-answering problem consists of an EDB D, an Existential Datalog program P and a conjunctive query (CQ) Q. A CQ Q is a conjunction ∃$x_1$ . . . ∃$x_r$Φ($x_1$, . . . , $x_r$, $y_1$, . . . , $y_s$) of atoms over variables $x_1$, . . . , $x_r$, $y_1$, . . . , $y_s$ where $x_1$, . . . , $x_r$ are existentially quantified, and where $y_1$, . . . $y_s$ are free. A "certain answer" to Q (relative to D and P) is a tuple ($a_1$, . . . , $a_s$) of elements from HU(D,P) such that D*∧P* logically entails the closed formula ∃$x_1$, . . . , ∃$x_r$Φ($x_1$, . . . , $x_r$, $t_1$, . . . , $t_s$) resulting from Q by replacing $y_i$ by $a_i$ for 1≤i≤s. The CQ answering problem for instance (D,P,Q) is to determine all certain answers to Q relative to D and P. A variant of this problem is to determine whether a certain answer exists, and if so, to find one certain answer. A special case of a CQ is a Boolean conjunctive query (BCQ). This is a CQ all of whose variables are existentially quantified. Such a BCQ Q is answered "true" if D*∧P* logically entails Q, otherwise it is answered "false".

The Certain Tuples Computation Problem. An Instance (D,P) of the Certain Tuple Computation Problem consists of an EDB D and an Existential Datalog program P. The problem is then to compute all certain atoms for (D,P), that is, all atoms R($a_1$, . . . , $a_r$) entailed by D*∧P* where R is a predicate symbol in D or P of arity r, and where for 1≤i≤r, $a_i$∈HU(D,P).

Unfortunately, the above problems, are all undecidable for general Existential Datalog programs. Therefore, various syntactic restrictions on Existential Datalog programs have been considered for which these problems are decidable. Some of these are discussed further below. The decision procedures for most decidable Existential Datalog fragments use a procedure referred-to as "Chase", which will be described next.

The Chase. Given that various different types of Chase are in the literature, a clarification is needed: Here "Chase" means the "oblivious Chase" which has been thoroughly described in the literature. The Chase is for Existential Datalog what the above-described least-fixed-point computation is for plain Datalog. In fact, the Chase of an Existential Datalog program P applied to a database D applies unsatisfied rules of P over and over and stops only if no unsatisfied rule is left. However, there are a number of important aspects in which the Chase differs from the already described least-fixed-point iteration procedure for plain Datalog.

First, the applicability of a rule at a stage in the Chase process is defined similarly as for plain Datalog, except that the ground substitutions θ in consideration now replace the variables in the body of a rule by elements of HU(I,P), rather than just HU(D,P), where I is the set (interpretation) containing all atoms of D plus those previously derived. This is because (as will be explained below) existential rules can create new elements that do not appear in D nor in P.

Second, at any given stage in the Chase, an interpretation I does not satisfy a rule ρ with a ground substitution θ from the body variables of ρ to elements of HU(I,P) if (1) ρ has not yet been applied with θ and (2) for each body atom A of ρ, θ(A)∈I. One then says that ρ with θ is unsatisfied by I (or in I).

Third, the application of a rule ρ of an Existential Datalog program P with a ground substitution θ to an interpretation I (containing the EDB D) by the Chase needs to take care of existentially quantified variables, that is, of all those variables that appear in the head of ρ but not in the body of ρ. Assume the body variables of ρ are $X_1$, . . . , $X_r$, and the existentially quantified variables in the rule head are $Y_1$, . . . , $Y_s$. Then $θ^+$ is the extension of θ defined as follows: for 1≤i≤r, $θ^+(X_i)=θ(X_i)$ and for 1≤j≤s, $θ^+(Y_j)=v_j$, where $v_j$ is a fresh null value (a.k.a. Skolem constant), i.e., a fresh artificial data element that is recognizable as such and does not occur in HU(I,P). The application of ρ with θ to a given Interpretation I then generates $I^+$ by adding the new ground atom $θ^+$(head(ρ)), that is, the atom resulting from the head atom of ρ by replacing each variable Z in this head atom by $θ^+$(Z). The newly created null values HU($I^+$,P) become members of the Herbrand universe HU($I^+$,P) which is defined as HU($I^+$,P)=HU(I,P)∪{$v_1$, . . . , $v_s$}.

Fourth, note that by the above definition, the chase may generate an infinity of new atoms. For example let "Par" be the program containing the following two rules: "parent(X, Y):—person(X)" and "person(Y):—parent(X,Y)". When starting with an EDB DO containing the unique atom "person(john)" the result of the Chase would be the infinite set of atoms {person(john), parent(john,c1), person(c1), parent(c1,c2), person(c2), parent(c2,c3), . . . }, where each Ci is a new Skolem constant. That the chase may have an infinite result is intended and will be discussed in more detail farther below. However, with recursive existential rules there is a pitfall to avoid: a group of rules may be used infinitely often over and over and may preempt other rules to fire. For instance, let "Part" be the program obtained from Par by adding the rule "child(Y,X):—parent(X,Y)". If one applies the rules in the wrong order, this rule may never fire. In fact, if the Chase were allowed to fire the rules in any order, then a particular execution sequence of rule applications by the Chase may give priority to the rules of Par, thereby infinitely delaying the application of the child rule. Thus, no child atom would ever be generated, and the result of all facts produced would be the same as the above infinite set obtained by chasing Par over DO. To avoid such unintended behavior, one requires the Chase to be fair, which means that any atom that can be at all derived from the EDB by applications of unsatisfied rules (applied in whatever order) must be derivable by the Chase after a finite number of rule applications. There is still a lot of freedom of using different rule application orderings when implementing a fair Chase algorithm. However, the following well-known fact that fairness—up to the names of Skolem constants—guarantees the uniqueness of the Chase: Let chase1 and chase2 be two realizations of the fair Chase that possibly use different orders of rule application, and let chase1(D,P) and chase2(D,P) be the sets of all atoms generated when applying P over database D via chase1 and chase2, respectively. Then chase1(D,P) and chase2(D,P) are isomorphic and differ only in the names of the null values (i,e. Skolem constants) generated by chase1 and chase2. The names of the null values are completely irrelevant to the QOT Problem, the CQ Answering Problem, and the Certain Tuples Computation Problem, as well as to most other relevant problems. Therefore, one safely writes "Chase(D,P)" to express the result of the application of any algorithmic realization of the fair Chase, keeping in mind that an application of any other fair Chase realization to D and P would yield an isomorphic result.

It is well-known that Chase(D,P) is extremely useful for answering the QOT problem, the CQ answering problem, and the certain-tuple computation problem. In particular, the following holds: (i) an instance (D,P,γ) of the QOT problem is a yes-instance (i.e., a positive instance), if and only if γ∈Chase(D, P); (ii) the solution to an instance (D,P,Q) of the CQ-answering problem, where Q is of the form $\exists x_1 \ldots \exists x_r \Phi(x_1, \ldots, x_r, y_1, \ldots y_s)$ as above, is precisely the set of all ground tuples $\gamma = (a_1, \ldots, a_s)$, such that for $1 \le i \le s$ $a_i \in HU(D, P)$ and belongs to the answer of Q over Chase (D,P); (iii) for an instance (D,P) of the Certain-Tuple Computation Problem, the solution precisely consists of the set of all ground tuples of Chase(D,P). From this it follows that if an implemented Chase procedure to compute Chase(D,P) terminates normally, i.e., does not terminate abnormally due to a time-limit, memory overflow, or similar reasons, then Chase(D,P) can be used effectively for the algorithmic solution of the three mentioned problems. In addition, (D.P) can be viewed as a knowledge graph with fact-based (extensional) and rule-based (intensional) knowledge, and thus, in case an implemented Chase procedure to compute Chase(D, P) terminates normally, the Chase procedure computes a materialization of the knowledge graph (D,P), that can be stored in a classical database and used, as explained above, for the effective algorithmic solution of essential algorithmic decision and computation problems.

A very useful rule application strategy to compute Chase (D,P) is level saturation. This strategy organizes the rule applications into levels, and proceeds level by level, starting with interpretation $I_0 = D$ and successively generating interpretation $I_{i+1}$ from interpretation $I_i \supset I_i$ as long as possible, by exercising all rule applications belonging to level i, which are precisely all applications of all rules ρ with substitution θ that are unsatisfied in $I_i$. Thus at the beginning all those pairs (p,θ) are identified that are unsatisfied in the EDB, and these are applied and the generated atoms are added to $I_0 = D$, then the same process is applied to $I_1$, and so forth. This guarantees that any atom that is derivable from D by the rules of P will eventually be derived, and thus guarantees fairness.

The level-saturating chase can be used to define the derivation depth ddepth(A,D,P) of each atom A in Chase(D, P): ddepth(A,D,P) (or just ddepth(A) if D and P are understood) is the smallest i such that A ∈

If φ is a ground atom or a Boolean conjunctive query, then φ is a logical consequence of D*∧P*, denoted by D*∧P*|=φ, if and only φ is satisfied in (and thus a logical consequence of) Chase(D,P), denoted by Chase(D,P)|=φ.
Dealing with infinite Chase results There are various approaches to deal with the possible infinity of the set of atoms Chase(D,P).

One approach is to leave it to the Existential Datalog programmer to ensure that the Chase will eventually stop, and thus generate a finite result Chase(D,P). This is just akin to normal programming, where it is the programmer's responsibility to ensure program termination.

Another approach is to compute Chase(D,P) only partially and stop the derivation of further atoms (i) after a certain number of atoms have been derived and/or (ii) a certain number of null values (Skolem constants) have been generated, or a certain derivation depth has been attained. These "cut-off" numbers in (i)-(iii) could either be fixed or be give in the input, or determined by some chosen computation method M via a function $f_M(D,P,maxqsz)$, that depends on the input database D (usually an EDB) and/or on the program P, and/or on a maximum query size maxqsz. Here, the maximum query size is the maximum number of atoms of a conjunctive query (or union of conjunctive queries) that one expects to be issued against the computed database EDB∪IDB.

Other approaches look for syntactic restrictions of Existential Datalog that guarantee that the Chase terminates after a finite number of steps. The best known of these restriction is weak acyclicity. To check whether a program P is weakly acyclic, one constructs a position dependency graph PDG(P) whose vertices are predicate argument positions (rather than predicates). For example, an n-ary predicate p has n positions p[1], . . . ,p[n]. There is an arc p[i]→q[j] from p[i] to q[j] if there is a rule ρ in P with head-predicate q, and having a p-atom A in the body such that (i) position p[i] of A contains a variable that also occurs in position q[j] in the head of ρ, or (ii) an existentially quantified variable occurs in position q[j] of the head of ρ. Moreover, if case (ii) applies, the arc is labeled by a special symbol (e.g, by "∃"), which is here denoted by p[i] $\stackrel{\exists}{\longrightarrow}$ q[j]. A program P is weakly acyclic if no labeled arc occurs on any cycle of PDG(P). Weakly acyclic programs P have two important properties: (i) Chase(D,P) is finite for each database D, and (ii) the Chase (where rules may be are applied in any order) stops automatically. An example of a weakly acyclic program is the following program LTC (for "labeled transitive closure"), whose only EDB relation "edge" and where "tc" and "labeled" are IDB relations:

tc(X,Y):—edge(X,Y);
tc(X,Z):—edge(X,Y), tc(Y,Z);
ltc(X,Y,$Z):—tc(X,Y);

The position dependency graph PDG(LTC) has as vertices all argument positions of each of its three predicates, and has the following arcs: edge[1]→tc[1], edge[2]→tc[2], tc[2]→tc [2], tc[1]→ltc[1], tc[2]→ltc[2], tc[1] $\stackrel{\exists}{\longrightarrow}$ ltc[3], and tc[2] $\stackrel{\exists}{\longrightarrow}$ ltc[3]. While there is a cycle in this graph, namely the loop tc[2]→tc[2], there is no cycle passing through a labelled arc, hence LTC is weakly acyclic.

Generalizations of weak acyclicity which enjoy the same properties (i) and (ii) are super-weak acyclicity and joint acyclicity.

More sophisticated syntactic restrictions have been studied that, even though Chase(D,P) may be infinite, guarantee that queries up to a given size maxqsz can be answered within a finite initial fragment of the level-saturating chase. Since the QOT problem and the Certain Tuple Computation problem can clearly be reduced to queries having maxqsz=1, also these two latter problems are solvable within this finite initial fragment. Therefore, under each of these syntactic restrictions, the three essential problems become decidable.

A first example includes the so-called linear Existential programs. These are programs whose rules have only one atom in their rule body (or one positive atom, in case of stratified negation). An example of a linear Existential Datalog program is the above mentioned program Par with the two rules "parent(X,Y):—person(X)" and "person(Y):—parent(X,Y)". As already explained, even for databases D with just a single person atom, Chase(D,Par) is infinite. For a conjunctive query Q,let sz(Q) denote its size, which is here the number of atoms that are part of it. There exists a function $f_{lin}(P)$ such that for each linear Existential Datalog program P, for every database D and conjunctive query Q, the answer of Q over Chase(D,P) is equal to the answer to Q over the first $sz(Q) \times f_{lin}(P)$ levels of Chase(D,P), which is a computable finite set. Concretely, this has been shown for $f_{lin}(P)=\#pred \times (2\omega)^\omega$, where #pred is the number of predicate symbols of P, and $\omega$ is the maximum of the arities of the predicates of P.

A more general class is the class of frontier-guarded Existential Datalog programs. Each rule of such a program must be frontier-guarded, which means that each rule ρ has a frontier-guard, that is, an atom G of its body covering each frontier-variable of the same rule body. A frontier-variable of a rule is one that occurs both in the head and in the body of the rule. In case of multiple frontier-guards in a same rule body, an arbitrary one may be chosen as "the frontier-guard" of the rule (for example, the leftmost atom containing all frontier variables). A rule is called "guarded" if its frontier-guard covers all variables of the rule body; in this case, frontier-guard is simply called "guard". An Existential Datalog Program is called (frontier-)guarded if all of its rule are (frontier-)guarded. Linear rules are obviously guarded and thus also frontier-guarded.

Let D be a database and P a frontier-guarded Existential Datalog program, then, the guarded Chase forest GCF(D,P) is a forest (i.e, a multi-rooted acyclic directed graph) whose vertices are labelled by the atoms from Chase(D,P), (each atom from Chase(D,P) labels at least one vertex but possibly multiple vertices), which is obtained from D and P as follows. Each atom A in D gives rise to a root node of GCF(D,P). If in the construction of Chase(D,P), a rule ρ having frontier-guard G is applied and generates an atom B=θ(head(ρ)) via a substitution θ, then each node labeled θ(G) has a child labeled B. For each atom C, the guarded depth gdepth(C,D,P) of an atom C in Chase(D,P) is zero for each root node of GCF(D,P) and otherwise is the length of any shortest path from a root to a vertex labelled C in GCF(D,P). Notice that, in general, the guarded chase depth of an atom is different from its derivation depth (but for linear Existential Datalog programs, these notions coincide). For each positive integer i denote by $Chase_g^i(D,P)$ be the set of all atoms A in Chase(D,P) such that gdepth(A,D,P)≤i.

There exists a function $f_g$ such that for each frontier-guarded (and thus also for each guarded) Existential Datalog program P and every database D and conjunctive query Q, the answer of Q over the possibly infinite set Chase(D,P) is equal to the answer to Q over the finite interpretation (i.e., atoms set) $Chase_g^{sz(Q) \times f_g(P)}(D,P)$. Concretely, this has been shown for the double-exponential function $f_g(P)=\#pred \times (2\omega)^\omega \times 2^{\#pred \times (2\omega)^\omega}$ where #pred and ω are, as above, the number of predicate symbols of P and the maximum of the arities of the predicates of P, respectively.

The classes of linear, guarded, and frontier-guarded Existential Datalog programs do not generalize plain Datalog. For example, the transitivity rule "r(X,Z):—r(X,Y), r(Y,Z)" is not frontier-guarded (the frontier variables X and Z are not jointly covered by any body atom) and therefore not guarded, let alone linear. For this reason, one has defined classes of Existential Datalog programs that generalize guarded and or frontier-guarded Existential Datalog and at the same time generalize plain Datalog. The principle of these classes is that body variables that occur in unaffected predicate positions do not have to be "guarded", that is, do not have to be covered by a guard or frontier-guard. A predicate position of an Existential Datalog program P is unaffected if it is not affected. A predicate position p[i] is affected if (i) p[i] is the position of an existentially quantified variable in a rule head, or (ii) some variable X occurs in an affected predicate position in the body of some rule ρ with head predicate p, and X also appears the position p[i] in the head of ρ. For whatever database D, no null value (Skolem constant) will ever occur in an unaffected predicate position of any atom in Chase(D,P). This means that only finitely many elements occur in unaffected positions. A weak guard of an Existential Datalog rule ρ is an atom in the body of ρ covering all those body variables of ρ that do not appear in any unaffected predicate position in the body of ρ. A weak frontier-guard of an Existential Datalog rule ρ is an atom in the body of ρ covering all those frontier variables of ρ that do not appear in any unaffected predicate position in the body of ρ. A rule ρ of an Existential Datalog program P is weakly (frontier) guarded if it has a weak (frontier) guard. The program P is weakly (frontier) guarded if each of its rules is weakly (frontier) guarded. In analogy to the chase forest for guarded programs, the weakly guarded chase forest WGCF(D,P) for a database D and a weakly guarded Existential Datalog program P is a forest (i.e a multi-rooted acyclic directed graph) whose vertices are labelled by the atoms from Chase(D,P), (each atom from Chase(D,P) labels at least one vertex but possibly multiple vertices), which is obtained from D and P as follows. Each atom A in D gives rise to a root node in GCF(D,P). If in the construction of Chase(D,P), a rule ρ having weak frontier-guard G is applied and generates an atom B=θ(head(ρ)) via a substitution θ, then each node labeled θ(G) has a child labeled B. For each atom C, the weakly guarded depth wgdepth(C,D,P) of an atom C in Chase(D,P) is zero for each root node of WGCF (D,P) and otherwise is the length of any shortest path from a root to a vertex labelled C in WGCF(D,P). For each positive integer i denote by $Chase_{wg}^i(D,P)$ be the set of all atoms A in Chase(D,P) such that wgdepth(A,D,P)≤i.

There exists a function $f_{wg}(D, P)$ such that for each weakly frontier-guarded (and thus also for each weakly guarded) Existential Datalog program P and every database D and conjunctive query Q, the answer of Q over the possibly infinite set Chase(D,P) is equal to the answer to Q over the finite interpretation (i.e., atoms set) $Chase_{wg}^{sz(Q) \times f_{wg}(D,P)}(D,P)$. Concretely, this has been shown for the double-exponential function $f_{wg}(D, P)=\#pred \times (|dom$ $(|D|+\omega)^{\omega} \times 2^{\#pred \times (|dom(D)|+\omega)^{\omega}}$, where #pred and ω are, as before, the number of predicate symbols of P and the maximum of the arities of the predicates of P, and where dom(D) designates the active domain of the database D, that is, the data elements occurring as arguments in atoms of D, and |dom(D)| denotes the cardinality (i.e., the number of elements) of the set dom(D).

A relevant subclass of weakly guarded Existential Datalog is the class "warded Existential Datalog". This has been implemented and used in the Vadalog knowledge graph management system.

Usefulness and Advantages of Existential Datalog

Existential Datalog is useful in various contexts, some of which are here briefly mentioned and/or illustrated.

Data Exchange. In data exchange, data from one database D1 with a given schema has to be transferred to another database D2 having a possibly different schema. This happens, for example, after a company acquisition, the data held in the database D1 of the acquired company needs to be transferred (as good as possible) into the database of the acquiring company. In such a case, D1 may, for example, have a relation "employee" with attribute schema (LastName, FirstName, Address), and D2 may have a relation "person" with attribute schema (Firstname, Lastname, Birthdate). The following Existential Datalog rule may be used for transferring the data from the employee relation to the person relation:

person (Firstname, Lastname, Null):—
  employee (Lastname, Firstname, Address);

By the above rule, those tuples in person that come from "employee" will have a (distinct) null value in the "Birthdate" field. The above rule is a so called source-to-target TGD in the terminology of data exchange. In addition, possibly recursive existential rules (aka"TGDs") can also be used on the target database itself for further processing. In general, existential rules are an essential tool for data exchange.

Ontological Reasoning It was already explained, how the ontological axiom house $\sqcap \neg isolated \sqsupseteq \exists neighbor\_property$, with its above-stated meaning, can be translated into an Existential Datalog rule. More generally, it has been shown that description logics of the DL-Lite family, as well as extensions of extensions of the $\varepsilon\mathcal{L}$ description logic such as $\varepsilon\mathcal{L}\ \mathcal{H}\ \mathcal{J}$ can be translated straightforwardly into guarded Existential Datalog, which is a more expressive formalism. This shows that Existential Datalog is well-suited for ontological reasoning. In a similar way, Existential Datalog has been shown to be useful for reasoning about UML class diagrams and other types of class diagrams.

Duplicate Management. It was also shown that Existential Datalog can be used for duplicate management in relational systems. Classical Datalog adheres to the set semantics, where a tuple can occur only once in a relation. However, considering duplicates is important for many practical applications, and therefore, commercial database management systems use by default bag semantics instead of set semantics. They usually keep duplicates by default and eliminate duplicates from query results only, when explicitly required, e.g. through a keyword such as DISTINCT or UNIQUE. It has been shown that Existential Datalog can simulate bag semantics via set semantics. This can be done by adding a unique identifier (for example as the last argument) to tuples. Assume, for example, that r with schema (X,Y,Z) and s with schema (V,Y,W) are binary relations and that the last column of both already consists of a unique identifiers. Thus r may, for example, contain two tuples r(a,b,1) and r(a,b,2) that actually express a double occurrence of the tuple r(a,b) in an equivalent database with a binary relation r that allows duplicates. Moreover, imagine that there are tuples s(c,b,3) and s(c,b,4) in the relation s, which reflects a pair of duplicates s(c,b) in the corresponding "classical" binary relation. Then, in the classical setting, the natural join $t=r\bowtie s$ is between the binary relations r and s (where duplicates are allowed) would contain four instances of the tuple t(a,b,c). This join can be simulated by the following Existential Datalog rule:

t(X, Y, V, Null):—r(X, Y, Z), s(V, Y, W);

This rule creates new unique identifiers for the resulting t-tuples, for example, 5,6,7,8, and thus produces the tuples t(a,b,c,5), t(a,b,c,6), t(a,b,c,7), and t(a,b,c,8),that correctly correspond to the four occurrences of t(a,b,c) in the join performed in a classical database system with duplicates.

Another reason for existential variables in rule heads is name invention. In automated web data extraction it is often necessary to combine multiple objects to a single object. To name the new compound object, existential quantification can be used. For example, on a web page, a user may see a table (displaying, say, articles and prices), but the HTML code underlying the web page actually implements this visual table by two HTML tables T1 and T2 that are of the same color and contiguous so that the user sees only a single table T. An advanced data extraction program that analyzes the web pages may recognize the situation and create a new object for T, even though such an object is not explicitly present in the HTML code. In a simplified exemplary setting, the creation of T from T1 and T2 can be expressed by the following existential Datalog rules:

tablebox(T, T1, T2):—htmltable(T1), htmltable(T2),
  color (T1, C), color(T2, C),
  horiz_contiguous (T1, T2);
  table (T):— tablebox(T, T1,T2);
containstable(T, T1):— tablebox(T, T1, T2);
containstable(T, T2):— tablebox(T, T1, T2);

The rules of this (simplified) example operate over a database that represents an extended parse tree (a.k.a. dom tree) of HTML documents. "htmltable" is a predicate (whose definition is not listed here) such that "htmltable(t)" is true for all nodes of the parse tree that are the head nodes of an HTML table. "color(t,c)" is true if the table corresponding to t is colored with color c. "horiz_contiguous(t1,t2)" is true if t1 and t2 are tables of the same height such that t2 is directly to the right of t1 and there is no line separating t2 from t1. We may assume here that the predicates color and horiz_contiguous were computed from the parse tree and added to the EDB. The first rule then introduces a new value (via the existential quantifier) which stands for an object that is a "tablebox" and contains tables T1 and T2.

Extensions of Existential Datalog

Most of the existing extensions to plain Datalog also work for Existential Datalog. A few are briefly mentioned here.

Stratification. The dependency graph DG(P) for an existential Datalog program P is defined in exactly the same way as for a plain Datalog program, and also the definition of stratification is the same. The execution of the Chase for stratified Existential datalog programs P on a database D can be concisely described as follows.

In case P belongs to a class of programs for which it is known that the Chase terminates, (e.g. weakly acyclic programs) one may execute the Chase stratum by stratum from the lowest to the highest. When stratum i+1 is executed, all (finitely many) atoms previously computed for lower strata ($\leq i$) jointly act as database. This way, for each stratum, negative atoms in rule bodies can be evaluated just as for plain datalog with stratified negation.

In case P belongs to a class of programs for which queries can be answered within a finite depth-bound of the chase (e.g. guarded or weakly frontier-guarded Existential Datalog), again, the Chase is executed stratum by stratum from the lowest to the highest. However, given that each stratum may now have an infinite result, the computation for each stratum is halted at the relevant depth bound (e.g., for weakly frontier-guarded programs, at derivation depth $f_{wg}$ (D,P), and thus also at depth $f_{wg}$(D,P) of WGCF(D,P). Again, each stratum gives rise to a finite number of atoms, and again, When stratum i+1 is executed, all (finitely many) atoms previously computed for lower strata (≤i) jointly act as database. This way, again, for each stratum, negative atoms in rule bodies can be evaluated just as for plain datalog with stratified negation.

Finally, if P does not belong to a known syntactic class guaranteeing chase termination, nor belongs (or is known to belong) to any class with a guaranteed depth bound, then before computing the result for a stratum i, the computation of all lower strata (<i) must have terminated before "chasing" the rules of stratum i. Of course, it is not guaranteed that this will happen, as there is no guarantee for Chase termination anyway.

Arithmetic Functions. Just as plain Datalog, Existential Datalog can be enriched with arithmetic functions, including also aggregate functions and comparison operators (that can be considered to be functions from numeric domains to Boolean). In general, this may destroy the finiteness of the Chase result, and is thus a potential danger, for example in case of a recursive rule p(X+1):—p(X) applied to a database {p(0)} However, in many cases, a careful or controlled use of arithmetic functions is useful and harmless.

Additional Declarations. In addition to the proper rules, various versions of Existential Datalog offer the possibility of making additional declarations of various types. The semantics of the permitted declarations has to be defined with each version of Existential Datalog. Some declarations may be optional while others mandatory. Examples of such declarations are: input(r) which specifies that a certain relation r is an input relation; maxatoms(k) or maxlevel(k) which specifies that the execution of the level-saturating Chase should be halted after i new atoms have been generated or after the k-th level has been computed, respectively. In some cases, instead of a constant k, such commands may also contain functional expressions that express a value, say, a function of the size of the input database. Another example which is useful, e.g., in the context of weakly frontier guarded Existential Datalog is a declaration such as maxqsz (k) which specifies that i is the maximum number of atoms any conjunctive query to be issued against the result Chase (D,P) of a program P and input database D (or, alternatively, the maximum size in terms of atoms of conjunctive queries for which the completeness and correctness of query-answering must be guaranteed). Other declarations that are allowed with certain versions of Existential Datalog are, for example, schema and/or type declarations. For example "Employee(FirstName:string,LastName:string,Salary:f32)", where f32 indicates that the type of the third argument of the Employee relation must be a 32 bit floating-Opoint number. Alternatively, if attribute names do not play a role, in some versions of Existential Datalog one may only specify the types of the arguments, for example by just stating "Employee(string,string,f32)" instead of the above. Every version of Existential Datalog may have its own set of possible additional declarations whose syntax and semantics should be clearly specified.

Skolem terms. As already explained, when "firing" existential rules, the Chase algorithm generates fresh new null values aka Skolem terms in those places of the newly generated atom that correspond to existentially quantified variables in the rule head. In some approaches, instead of meaningless null values (Skolem constants), structured Skolem terms are used that carry more provenance information. For example, let $\rho_i$ be the i-th rule of an Existential Datalog program P, and let BV($\varphi$={X1, ..., Xk} be the set of body variables of $\rho_i$ of which {Y1, ...,Yh}⊆BV($\varphi$ are the non-existential head variables. Moreover, assume that the existentially quantified head variables are, in order, Z1, ... Ze. When $\rho_i$ is applied with a substitution θ, then, for Zj, instead of just a meaningless new null value, a Skolem term f[i,j](θ(X1), ..., θ(Xk)) may be created and inserted at the position of Zj in the atom created by the rule application. The advantage here is that such terms carry "provenance history":

The term reveals from which data and by which rule and head variable it was derived. In naive implementations of the level-saturating Chase algorithms, the size of such Skolem terms may grow exponentially in the level. However, by keeping a table in which each term is identified by a separate name (that can be used as a subterm of further terms instead of the term proper) a system can avoid this drawback.

Implemented Existential Datalog systems. There are various implemented systems of Existential Datalog. A few examples are Vadalog, Graal, Shy DLV, and Vlog.

Differential Dataflow

Differential Dataflow is a computing framework, which allows to define computations over changing data. The term "Differential" shall point out that computations are stateful and maintained in such a way that changing input data does not generally have an entire re-computation as a consequence, but instead previous results are re-used to update the new computation result. On the other hand, the term "Dataflow" shall point out that computations are defined as directed operator graphs, where each operator realizes a step of the computation. Thus, the final results are obtained from input data "flowing" (step-wise) from operator to operator eventually forming the final result. Within this disclosure, and implementation of Differential Dataflow in the Rust programming language is used. However, any other modern programming language can be used for an alternative implementation of Differential Dataflow.

Differential Dataflow Concepts

Sufficient notions and concepts of Differential Dataflow will be introduced, in order to understand the matter of the examples described herein. However, detailed internal mechanics of Differential Dataflow are not presented. As Differential Dataflow is written and provided for the Rust programming language, the following descriptions will make use of Rust in some of the examples to follow, but only to an extent that suffices to understand the principles and main ideas.

Collections

The most central data structure from a Differential Dataflow user perspective is a so-called Collection, which is a multi-set and essentially stores triples of the form (Data, Time, Multiplicity). Such a triple represents the fact of Data being present Multiplicity-times at some logical (discrete) Time. For example, if some collection contains the triple ((a, b), 0, 2), the pair (a, b) is present 2-times at time 0.

Any simple or complex compound data type might be used for Data, as long as certain properties are satisfied, and it is very common to use operators taking a collection with data of type Data as input, and producing data of type Data' as output.

Time can be seen as a timestamp, likewise of a possibly bespoke data type. The notion of an abstract discrete time is an essential mechanism in Differential Dataflow to annotate data with a timestamp, and thereby realize changing input data over time.

Multiplicity is an integer value, where negative values n<0 represent the n-many removal of data, and positive values n>0 denote n-many additions of data to some collection.

Operators

Differential operators take one or more collections as input and return a newly formed collection. For example, the map-operator takes a collection as input, together with an arbitrary code applied to each element in the input collection which yields new elements forming the output collection. The following single code line shows the mechanics of the map-operator:

let output=input.map(|(x, y, z)| (x,z));

Here, a collection named output is obtained from applying the map-operator to a collection named input. The argument to the map-operator is an individual anonymous function (or lambda function), mapping each tuple (x, y, z) of the input collection to the tuple (x, z), equivalent to the mathematical notation (x, y, z)|(x, z).

All operators returning a collection can be applied in a compositional style. For example the previous code can be extended as follows:

let output=input
  .map(|(x, y, z)| (x, z))
  .filter(|(x, z)| x>5);

Here, the filter-operator is applied upon the collection returned by the map-operator, which only keeps tuples where the value at the first position is greater than 5. Within this embodiment, the following operators are used and briefly explained further: map, filter, join, concat, distinct, consolidate, and inspect.

map-operator: In addition to what has been said above, it is worth mentioning that the map operator is not only used to realize projections on positions of an input tuple, but rather is intended to realize arbitrary mappings. Especially introducing constant values, or dynamically computed function values to form altogether new tuples, is a main application of the map-operator.

The following snippet exemplifies a map-operator application, where the ternary input tuple (x, y, z) is mapped to a tuple of arity four, adding a string constant "some string", and a dynamically determined value 42+y.

let output=input
  .map(|(x, y, z)| {
    (x, z, 42+y, "some string")
  });

filter-operator: applying this operator allows to retain only tuples of the input collection which satisfy a certain Boolean expression. The expression can be an arbitrary Rust expression evaluating to true, or false. In the following example, only tuples (x, y, z) are kept, where x and y sum up exactly to z.

let output=input
  .filter (|(x, y, z)| z==x+y);

join-operator: this binary operator joins two given collections. It assumes tuples of the form (key, value), and will join tuples of both input collections with matching key-pairs. This might require pre-processing of the input collections, as well as post-processing of the join result to individuals needs by using the map-operator. The following example shows these aspects.

let input1_kv=input1.map(|(x, y, z)| {
    ((y), (x, y, z))
  });
let input2_kv=input2.map(|(v, w)| ((w), (v)));
let output=input1_kv
  .join(&input2_kv)
  .map(|(key, value)| value);

Here, an input collection input1 with tuples of the form (x, y, z) is turned into a collection input1_kv with pairs of the form ((y), (x, y, z)) where (y) represents the key, and (x, y, z) is the actual value. Similar, for the input collection input2, a collection input2_kv is obtained from mapping pairs of the form (v, w) to pairs of the form ((w), (v)). As a consequence, the join operator will join tuples of input1_kv and input2_kv, where the key values match—that is, where y=v. The last application of the map-operator merely serves the purpose to project on the value of the join result, dropping the key values again.

concat-operator: the tuples in two separate collections can be accumulated into a new collection representing the union, using the concat-operator. In the following example, an input collection input2 is concatenated to an input collection named input1.

let output=input1
  .concat(&input2);

distinct-operator: as differential dataflow generally adheres to a multi-set semantics, tuples might have multiple occurrences within a collection, the distinct-operator can change the multiplicity to a value such that there is at most one occurrence of a tuple.

let output=input.distinct( );

consolidate-operator: triples (Data, Time, Multiplicity) with equal Data and Time components are grouped together and their multiplicities added up. Therefore, the distinct operator should ideally be used adjacent to an application of the consolidate-operator.

let output=input.consolidate( );

inspect-operator: the input collection of the inspect-operator is not (and can not be) changed, but can be inspected and arbitrary code applied to each triple.

The following snippet merely prints each triple to the standard output using Rust's println! macro.

input.inspect (|triple|{
    println!("Seeing: { }", triple);
  });

Usefulness and Advantages of Differential Dataflow

Differential Dataflow has several advantages over other computational frameworks, some of which are here briefly emphasized, and which are the main reason for the choice of Differential Dataflow as lower level computing machinery.

Differential (stateful) computation: a unique feature of Differential Dataflow is the ability to handle updates of incoming data (data is added, or deleted) in such a way, that the result of the realized computation is as well represented as updates (changes made to the previous result). For example, from the result of joining two input collections, a tuple needs to be added in case a matching tuple has been presented as input. Differential Dataflow is also able to determine this change in the join result, without re-computing the entire join of the (changed) input collections again, but rather build upon the previous computation state and reuse intermediary partial results thereof.

As a consequence, vast computational savings can be achieved, as time-costly computations do not need to be run again in its entirety, but only necessary fractions affected by the changes in the input. The system discussed herein can provide streaming applications on large data-volumes with high-frequently changing input data.

Data Parallelism: while the emphasis in this is on the differential aspects, another huge concomitant with Differential Dataflow is the ability to realize data-parallel computations. This allows to have multiple computing nodes, equipped only with a fraction of the entire input data, each contributing to the final result. Within this example this aspect is not further exploited, as the stateful computation is of main interest.

In one example, a version of Existential Datalog used as input language is Elementary Existential Deltalog (EE-Deltalog, to be defined below) and the Differential Dataflow code resulting from the translation of an EE-Deltalog program P is called Tr(P). The generated program Tr(P) is code written in the programming language Rust augmented by Differential Dataflow constructs and operators. FIG. 1 depicts the translation or conversion of an EE-Deltalog program having source code into Rust program code using Differential Dataflow. That is, an EE-Deltalog program (105), located as text file in some type of storage, is given as input (110) to the compiler component (115). While the compiler itself can be implemented in any suitable programming language, the compiler component (115) produces Rust code, and writes it (120) to a file (125) containing the core translation, residing in any type of storage (125). The translation of the input program itself is not a full application, and needs to be enhanced with use case specific application code (135), available from some storage. Both, the translation (125) and application code (135), are read from their storage location (130 and 140) by the final compilation step (145), which yields a binary executable Rust application file (155), written (150) to some storage.

Figure 2:
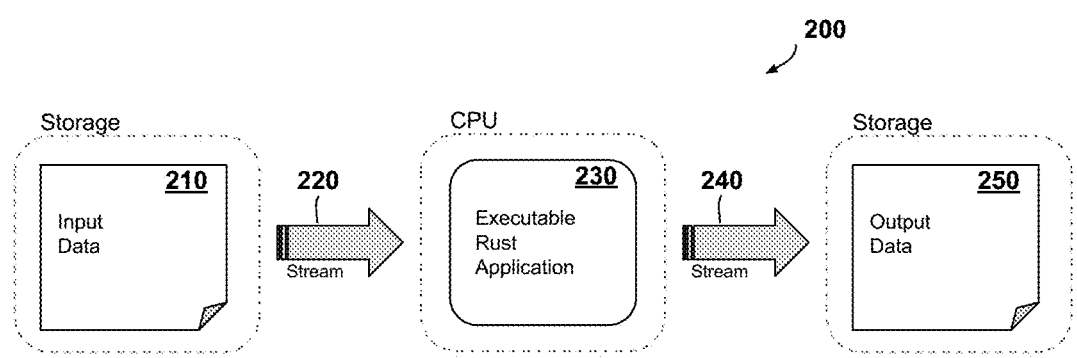
FIG. 2 is an overview on the execution of the application resulting from the translation, and depicts the input and output behaviour according to an example of the instant disclosure.

FIG. 2 builds upon FIG. 1, and shows schematically how any application resulting from translating an EE-Deltalog program is executed. In detail, the binary executable, resulting from the previous translation (155), is loaded into the working memory of some computing device, and eventually executed (230). The continuously running application is able to receive input data (that is, updates for any of the EDB relations) from some storage (210), via some streaming middleware (220). These input updates are taken into account, updates to the query result are determined by 230, and given to streaming middleware (240).

As an example may include use of a compiler in the sense that EE-Datalog programs are translated into native Rust code, which then has to be compiled by a Rust compiler (not further specified within this disclosure) in order to obtain executable machine code. Thus, the presented translation itself can be seen as compiler approach, and the final application is obtained in a two-step compilation, from EE-Datalog into Rust code, and from Rust code into executable binary machine code. In an extension, this could be overcome by combining these two steps into one, which would allow for shorter development cycles.

In contrast, an interpreter of EE-Datalog programs would basically implement the translation in the same way by using the same Differential Dataflow principles and translations, but would also directly execute the resulting program. Also, an interpreter might realize the translation via intermediary language layers, transforming an EE-Datalog program into an dataflow object model which is dynamically executed.

Figure 3:
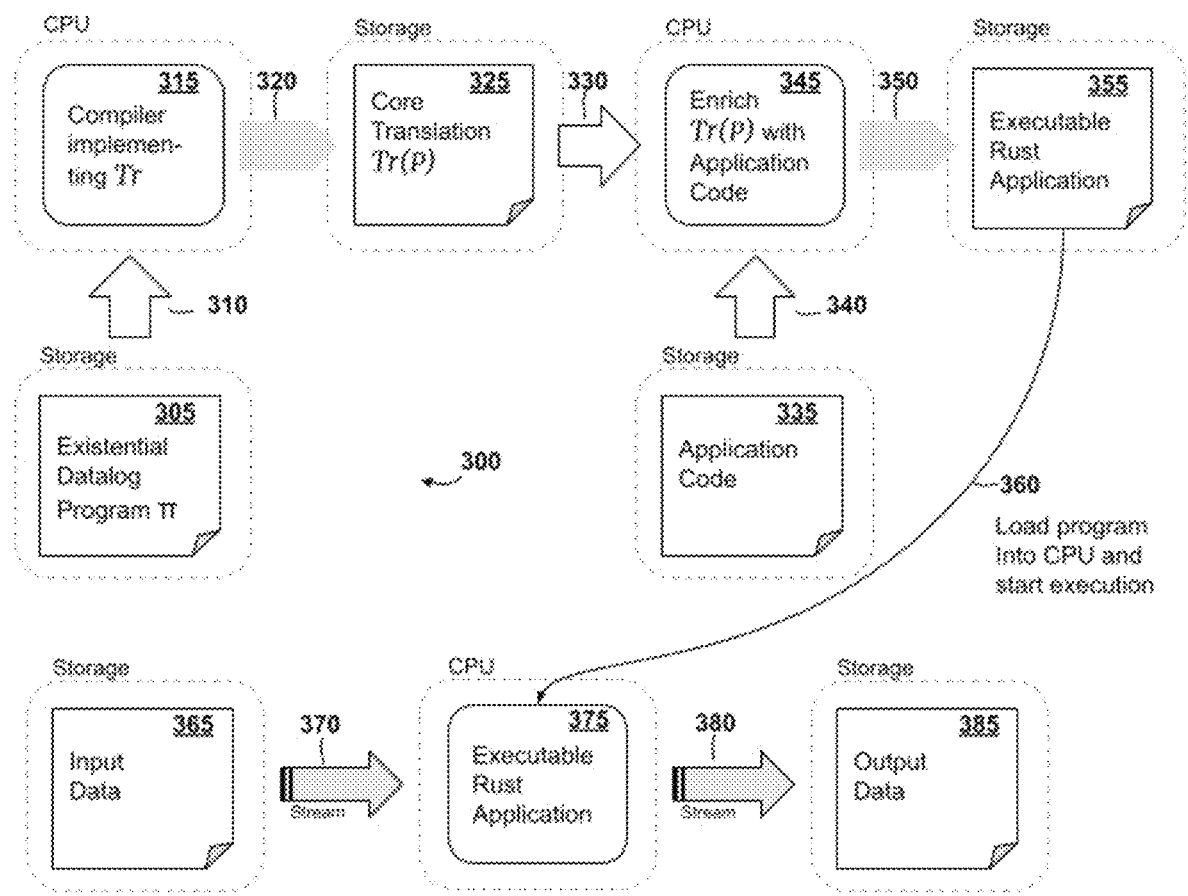
FIG. 3 is a comprehensive combined view of FIG. 1 and FIG. 2, resembling an interpreter of EE-Deltalog programs according to an example of the instant disclosure.

FIG. 3 depicts a scenario, where an implementation of the translation (305-355) and the execution of the resulting executable application (360-385) is realized within one single component/system—an interpreter.

Other examples use syntactically richer Existential Datalog variants as input language. Some of these examples comprise one or more of the following features: (i) the use of zero-ary predicates (i.e., propositional predicates), (ii) the use of stratified negation in rule bodies, (iii) the use of arithmetic predicates in rules (iv) the use of additional declaration.

More generally, there are various embodiments by which an existential Datalog program P is translated into a program Trans(P) formulated in a target programming language augmented by Differential Dataflow constructs and operators. Here "Trans(P)" is a generic name for such a translation while Tr(P) is the specific translation for an example discussed herein. Thus, as an example, Trans(P)=Tr(P).

In many examples, Trans(P), when executed over an input database D, essentially executes a fair Chase, and in some examples, even a level-saturating Chase, with the goal of computing Chase(D,P). In preferred embodiments, when the computation of Trans(P) with input D halts normally, then Trans(P) has effectively computed Chase(D,P), and Chase (D,P) can thus be used for an effective algorithmic solution of essential problems such as the Query of Tuple Problem, the Conjunctive Query Evaluation Problem, and the Certain Tuples Computation Problem.

In various embodiments, Trans(P) can be enriched by application code, that implements, for example, different kinds of input and output functions, or that integrates Trans(P) into a streaming middleware such as, e.g. Apache Kafka. Some embodiments use Trans(P) for dynamically maintaining a relational database. For example, an extensional database may be ingested to Trans(P) as a stream of data or of inserts and deletes, and Trans(P), using additional application code, updates via insert and delete operations an external relational database that contains IDB relations corresponding to IDB-predicates.

In order to deal with cases, where Chase(D,P) is infinite, some advanced embodiments analyze whether P belongs to some special classes for which a finite initial part of Chase (D,P) is sufficient for solving problems such as the Query of Tuple Problem, the Conjunctive Query Evaluation Problem, and the Certain Tuples Computation Problem, and generate code that produces a sufficient finite part of Chase(D,P) only.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Ranges are used herein shorthand so as to avoid having to list and describe each and every value within the range. Any appropriate value within the range can be selected, where appropriate, as the upper value, lower value, or the terminus of the range.

Unless indicated to the contrary, numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

The words "comprise", "comprises", and "comprising" are to be interpreted inclusively rather than exclusively. Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing" and "consisting of" may be replaced with one another throughout the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

"Typically" or "optionally" means that the subsequently described event or circumstance may or may not occur, and that the description includes instances where said event or circumstance occurs and instances where it does not.

Wherever the phrase "for example," "such as," "including," and the like are used herein, the phrase "and without limitation" is understood to follow unless explicitly stated otherwise.

Example Hardware and Software

Hardware infrastructure may include one or more a computing devices comprising at least one processor, memory consisting of transitory storage and, in some examples, in addition, also non-transitory storage, the computing devices being able to execute programs stored in the memory, to accept input from a user or from some application and store this input in its memory, and to provide the output of a computation either through an interface or by storing the output into an accessible memory space.

The software infrastructure may comprise an environment for software execution, where a stored program can access an Existential Datalog Program as input and produce as output Differential Dataflow code. This code can be a stand-alone program or is executed by an interpreter.

Example Embodiments

As an example, a system may include a compiler that takes as input an Essential Existential Deltalog (EE-Deltalog) Program and returns as output.

Essential Existential Deltalog (EE-Deltalog)

An EE-Deltalog program consists of Datalog rules involving non-nullary (i.e., non propositional) IDB atoms (those are precisely the atoms occurring in the rule heads), and IDB and non-nullary EDB atoms whose arguments are constants or variables, and arithmetic comparison atoms in infix notation built from the comparison operators "=", ">", "<", ">=", "<=", "!=", whose first argument is a variable occurring in the rule body, and whose second argument is either a variable (starting with a capital letter) occurring in the rule body or a constant (starting with a lower case letter or enclosed in single quotes). Each rule is terminated by a semicolon. We refer to both IDB and EDB atoms (but not comparison atoms) as "regular atoms".

An EE-Deltalog program that is executed in the context of differential dataflow defines IDB relations based on EDB relations it receives as input streams. In normal applications, then something is done with the EDB and IDB relations, for example, they are stored into a database or they are printed, or can be queried by an interactive user. The code doing this is here called "application code", and consists of a piece of Rust code (possibly including variable declarations) that can access and use the relevant data relations from the Rust code that is the translation of the EE-Deltalog program. What the application code precisely does is not relevant to the translation, and it is just assumed that the application code is known in the context of the EE-Deltalog program, and it will be referenced as <Application_Code>. The translation will then merely specify where the application code needs to be placed.

ASSUMPTION: For the sake of a simpler illustration, it is assumed that every rule body contains at most two regular atoms. It is, in fact, well-known, and easy to see that every Datalog program P that does not satisfy this assumption can be rewritten by use of auxiliary predicates into one that fulfills the assumption and which is semantically equivalent to P for all predicates of P. The same is true for EE-Deltalog programs. This assumption is therefore not limiting.

Consider, for example, the following EE-Deltalog program "Flightconn-orig" which operates on EDB relations "direct" and "country" and computes from these IDB relations "connection" and "labeled":

Example Program "FlightConn-orig":
  input direct;
  input country;
  connection (X,Y):—direct (X,Y),
    country (X, usa),
    country (Y, usa);
  connection (Y,X):—connection (X,Y);
  connection (X,Z):—connection (X,Y),
    connection (Y,Z),
    X!=Z;
  labeled (X,Y,$Z):—connection (X,Y);

The "input" commands of this program declare "direct" and "country" as sole EDB variables. The "direct" relation (or data stream) is supposed to contain a pair <airport1, airport2> of distinct airport IDs if there is a direct flight from airport1 to airport2. An example of such a pair is <lhr,jfk>, which stands for a direct connection from the London Heathrow airport to the JFK airport. The "country" relation associates to each airport its country. It contains tuples such as <lhr,uk> and <jfk,usa>. All other variables are IDB variables. In particular, the program defines the following IDB relations:

connection, which contains pairs of distinct US airports that are reachable either directly or via multi-leg flight connections whose flights are all between US cities.

labeled, which contains for each airport connection <A,B> in "connections" a pair <A,B,L>, where L is a unique label generated by the EE-Deltalog program for this connection via the existentially quantified head variable $Z of the last rule of FlightConn-orig.

Note that the body of the first rule of the FlightConn-orig program contains three regular atoms. Thus, FlightConn-orig violates the above assumption about at most two regular atoms per rule body. However, it can easily be rewritten into a program satisfying the assumption, for example, by replacing the two atoms country(X,usa) and country (Y,usa) by a single atom aux(X,Y), where "aux" is an auxiliary IDB predicate, and by adding the rule "aux(X,Y):—country(X, usa), country (Y,usa)". The resulting program "FlightConn", shown here below, will be taken as a running example.

Example Program "FlightConn":
  input direct;
  input country;
  connection (X,Y):—direct (X,Y),
    aux(X,Y);
  aux(X,Y):—country (X, usa),
    country (Y, usa);
  connection (Y,X):—connection (X,Y);
  connection (X,Z):—connection (X,Y),
    connection (Y,Z),
    X!=Z;
  labeled (X,Y,$Z):— connection (X,Y);

The Translation

Figure 4:
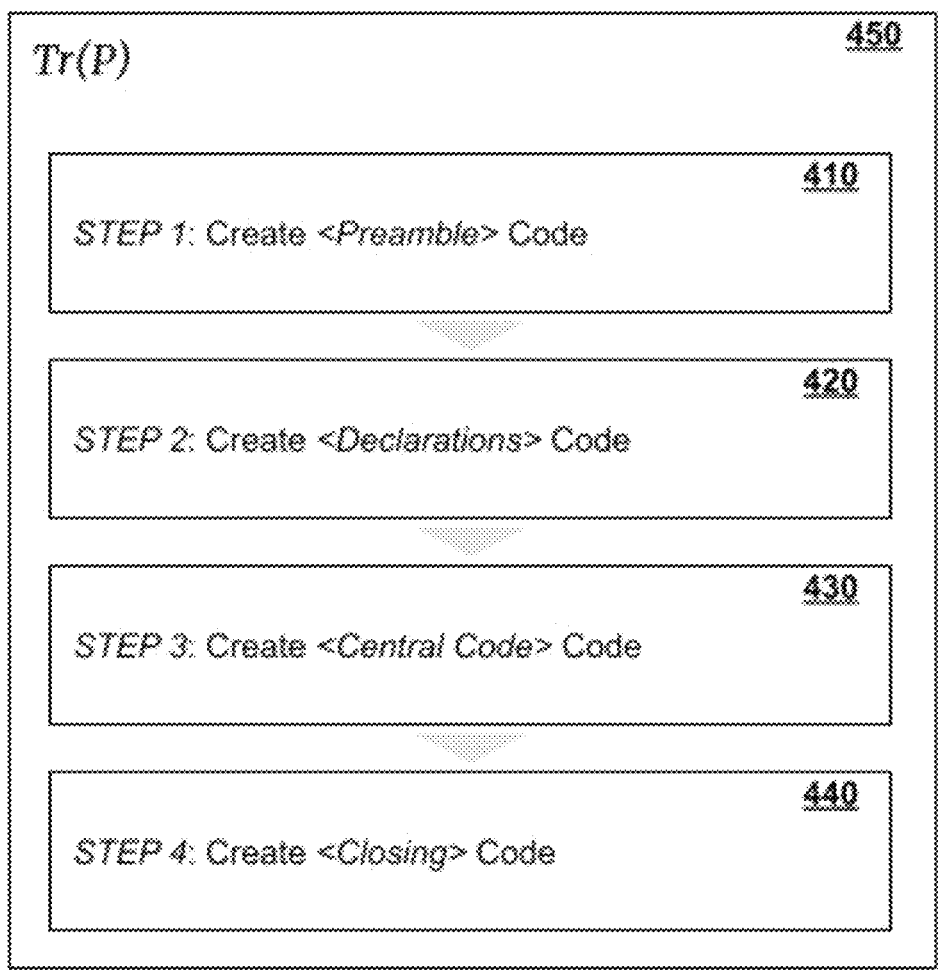
FIG. 4 depicts all steps of the translation of an EE-Deltalog program according to an example of the instant disclosure.

As shown in FIG. 4, let P be an EE-Deltalog program fulfilling the above assumption of at most two regular atoms in rule bodies. The translation Tr(P) (450), in presence of an application module, is then a Differential Dataflow program i.e., a Rust Program that accesses the Differential Dataflow Environment, of the following structure of four contiguous code blocks:

Tr(P)=<Preamble> <Declarations> <Central Code> <Closing>

In the following, the generation of each of the blocks of Tr(P) (450) is described step by step by four steps (410-440), each corresponding to the generation of one block. The <Preamble> block is fixed, but the other blocks depend on the program P. A fifth application-dependent step will modify the result Tr(P) to accommodate an application such as, for example, printing or querying one or more data relations.

To illustrate how elements of P are translated Tr(P), the above example program "Flight-Conn" will be used.

Step 1: Creation of the <Preamble> Code Block (410)

<Preamble> stands for the following fixed block of code, which is totally independent of the input EE-Deltalog program:

extern crate timely;
  extern crate differential_dataflow;
  use std::io;
  use differential_dataflow::input::{Input};
  use differential_dataflow::operators::{Join, Consolidate, Threshold};
  use differential_dataflow::operators::iterate::Variable;
  use timely::dataflow::Scope;
  use timely::order::Product;
  fn main( ){
    timely::execute_from_args(std::env::args( ), |worker| {

This code first defines the use of the external frameworks Differential Dataflow and Timely Dataflow (Lines 1-2), and then declares use statements in order to import all necessary modules from the Differential Dataflow and Timely Dataflow frameworks (Lines 4-9); this comprises methods and objects such as, Input, Join, an iteration Variable, Scope, and Product.

With Line 11, the above code also exhibits the beginning of the definition of a function main which, by default, represents the main entry-point for an executable binary application in the Rust programming language. Similar, Line 12 shows the main entry-point of the timely differential computation scope; i.e. all subsequent translation steps rely nested inside that (timely) scope. Thereby, it is enabled that the computation steps defined inside this scope operate within the timely dataflow environment and can, in principle, be distributed among a cluster of computing nodes. Note again that, Lines 11-12 merely show the opening of these methods, whereas steps described subsequently constitute the content of these methods; thus the syntactically required closing parentheses are part of the <Central Code> block.

Step 2 Creation of the <Declarations> Code Block (420)

Assume that $edb_1, \ldots, edb_m$ are the EDB relations of program P, and that $idb_1, \ldots, idb_n$ are the IDB relations of P. Then, the following code block <Declarations> is appended to <Preamble>:

let (mut, mut edb$_1$_in, mut edb$_2$_in, . . . , mut edb$_m$_in)=
worker.dataflow(|scope| {
   let (edb$_1$_in, edb$_1$)=scope.new_collection ( );
   let (edb$_m$_in, edb$_m$)=scope.new_collection ( );
   let (_, idb$_1$)=scope.new_collection ( );
   . . .
   let (_, idb$_n$)=scope.new_collection ( );

The dots are here understood as ellipses that indicate that the intermediate predicates give rise to similar lines. Essentially, this piece of code defines the collections (multi-sets) relevant to the program's dataflow: one Rust collection edb$_i$ for each EDB relation, for 1≤i≤m, each linked to a corresponding input stream edb$_i$_in, and one collection edb$_j$ for each IDB relation, for 1≤j≤n, not linked to any input stream. The IDB relations $idb_1, \ldots, idb_n$ are also defined as new collections, though without an associated input stream handle, since these relations will be defined upon compositions of the EDB relations $edb_1, \ldots, edb_m$. The code essentially defines the first part of a dataflow definition, which is shown in the above declarations of all necessary EDB and IDB relations. Note that the remaining code blocks, except <Closing>, will be inside the worker.dataflow{ } call, thus are part of the definition of the timely dataflow. Also note that the corresponding input stream-handles edb$_1$ ∈, . . . , edb$_m$_in are returned from the worker.dataflow{ } method, such that application code can ingest updates into each of the EDB relations.

For the above FlightConn example, the following code block <Declarations> is generated:

// - - - - Code Block <Declarations> generated by STEP 2 - - - -
let (mut direct_in, mut country_in)=worker.dataflow (|scope| {
   let (direct_in, direct)=scope.new_collection ( );
   let (country_in, country)=scope.new_collection ( );
   let (_, connection)=scope.new_collection ( );
   let (_, aux)=scope.new_collection ( );
   let (_, labeled)=scope.new_collection ( );

Step 3 Creation of the <Central Code> Code Block (430 & 510)

Figure 5:
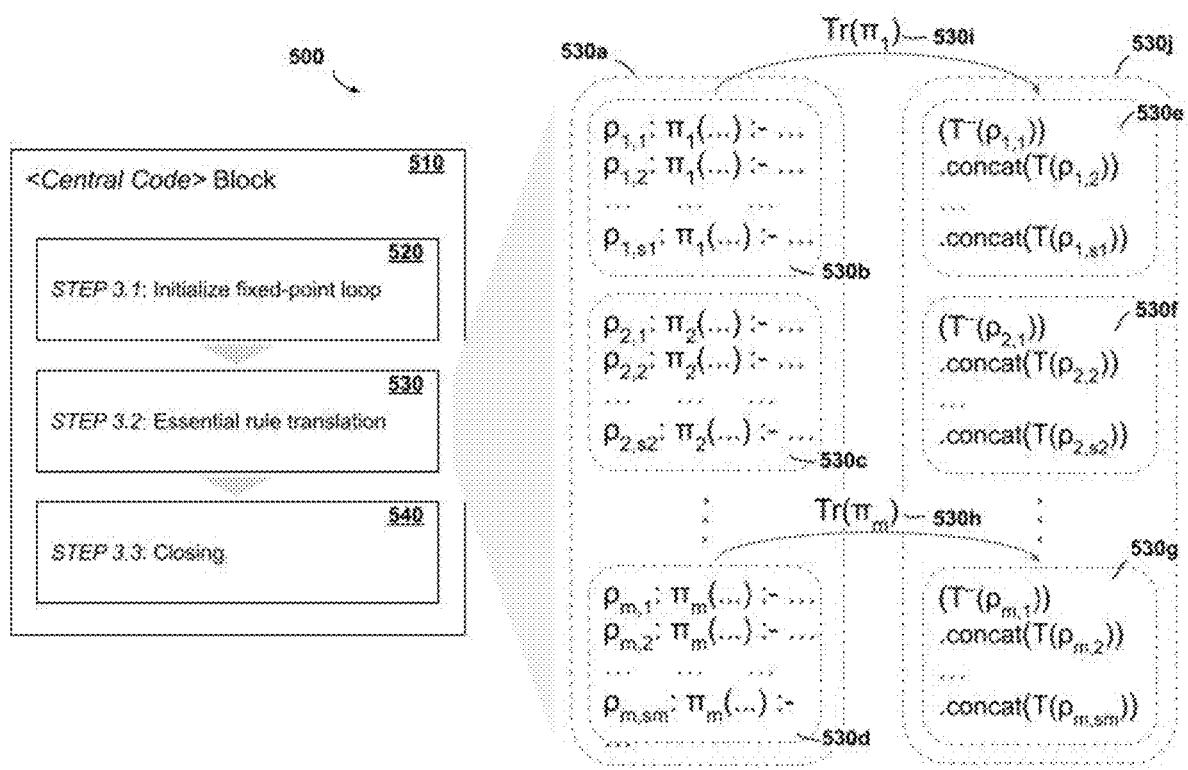
FIG. 5 provides the steps of the main core translation, that is the essential translation of all rules of some EE-Deltalog program according to an example of the instant disclosure.

As shown in FIG. 5, this step can be divided into three sub-steps STEP 3.1-STEP 3.3 (520-540) which are briefly summarized as follows, and which are explained in detail further below:

STEP 3.1 (520): Generate Differential Dataflow Rust code that (i) initiates a recursive fixed-point loop (ii) defines a "null_counter" variable (for keeping track of the largest null-value so far generated) initialized with value zero inside this loop, and (iii) bring all IDB predicates of P into that loop and (iv) generate a recursive variable for each IDB predicate. Append the code generated in this sub-step to the end of the code generated so far, i.e., to the end of the code generated by STEP 2 (420).

STEP 3.2 (530): This step performs the essential translation of rules. For each IDB predicate π of P, generate a translation Tr(π) (530$i$ & 530$h$), which defines the Rust collection corresponding to i as a union (="concatenation" in Differential Dataflow terminology) of the collections corresponding to the rules having head-predicate 71.

In particular, each of these rules gives rise to a Differential Dataflow expression which can be interpreted as a relational query implemented in form of Differential Dataflow operators that are applied in a specific order (for example 625). By using the "consolidate" and "distinct" operators it is made sure that the set-semantics of Datalog is maintained, and is not implicitly replaced by the bag-semantics which would otherwise be used by default in the Differential Dataflow framework. In case of an existential variable ζ in the rule head, code is generated that, for each different instantiation of the body variables corresponding to a different result of the corresponding relational query, increments a null-counter by 1 and inserts this new value into the argument positions of ζ in π (730).

STEP 3.3 (540): Generate a piece of code that returns all EDB and IDB relations to the outer scope containing the recursive loop, so to make them accessible to application code. Furthermore, all IDB relations are added as additional input to the their corresponding recursive variables so to ensure real fixed-point behaviour. Finally, at the end of this step, all still open parentheses are closed.

Sub-steps 3.1-3.3 (520-540) are explained in detail here below.

Details of Step 3.1 (520)

(i) For the initiation of the main fixpoint loop, the following code is generated:

let (idb$_1$, . . . , idb$_n$)=
   scope.iterative::<u64, _, _>(|fixed_point_loop| { here, $idb_1, \ldots, idb_n$ stand for (and ought to be replaced with) the names of the IDB relations of P.

(ii) For the definition and initialization of the null_counter variable, the following line of code is generated, which declares a mutable variable "null_counter" initialized with the value 0: let mut null_counter=0;

(iii) The EDB and IDB predicates of P are then made available inside the main iterative loop and by generating for each such predicate i the following "let" command:

let π=π.enter (fixed_point_loop);

As an explanation, a Differential Dataflow collection has a method "enter", which takes a variable of type "iteration scope" as argument and returns a new collection which can be henceforth used within this given iteration scope. In the above statement, π is brought into the main iterative loop scope, represented by the fixed_point_loop variable.

(iv) For each IDB predicate i, a recursive variable is defined by generating the following "let" command:

let π_recursive_var=
   Variable::new_from(π.filter (|_| false),
     Product::new(Default::default ( ), 1));

The above statement will create a "Variable" object, provided by differential dataflow, which represents a recursive collection (or, as the name suggest, a conceptional recursive variable). It represents the collection corresponding to the value in each iteration of the comprising fixpoint loop. Indeed, such a variable is created for each IDB predicate i, even though might not be of recursive nature.

For the FlightConn example, the code generated by STEP 3.1 looks as follows:

let (connection, aux, labeled)=
   scope.iterative::<u64, _>(|fixed_point_loop| {
   let mut null_counter=0;
   let direct=direct.enter(fixed_point_loop);
   let country=country.enter (fixed_point_loop);
   let connection=connection.enter (fixed_point_loop);
   let aux=aux.enter (fixed_point_loop);
   let labeled=labeled.enter (fixed_point_loop);

```
let connection_recursive_var=
    Variable::new_from (connection.filter(|_| false),
    Product::new(Default::default ( ), 1));
let aux_recursive_var=
    Variable::new_from(aux.filter (|_| false),
    Product::new(Default::default ( ), 1));
let labeled_recursive_var=
    Variable::new_from(labeled.filter(|_| false),
    Product::new(Default::default ( ), 1));
```

Details of Step 3.2 (530)

Convention: When Rust code is displayed in a separate line or block of lines, it is not enclosed in double quotes. When it is displayed inline with English text, it is enclosed in double quotes.

For each IDB predicate $\pi$ of P, the Rust code $Tr(\pi)$ defining a collection corresponding to $\pi$ is defined as explained in the following points (a)-(d) (for example 530*i*-530*h*).

(a) If $\pi$ is a recursive predicate, i.e., $\pi$ occurs on a cycle if the dependency graph DG(P), then $Tr(\pi)$ is the Rust code
let $\pi=\pi$.concat(&$Tr^*(\pi)$)
where $Tr^*(\pi)$ is defined further below under Point (c). Informally, this means that at every iteration of the main fixed-point loop initialized in STEP 3.1(i) (520), the new tuples $Tr^*(\pi)$ generated by an application of the rules whose head-predicate is i are added to the data relation corresponding to $\pi$.

(b) If $\pi$ is a non-recursive predicate, then $Tr(\pi)$ is the Rust code "let $\pi=Tr^*(\pi)$".

(c) Let s be the number of rules defining the predicate $\pi$ in the program P, and let $\rho_1, \rho_2, \ldots \rho_s$ denote these rules (for example 530*b*-530*d*). Then, $Tr^*(\pi)$ is the following piece of Rust code (530*e*-530*g*)
$(T^-(\rho_1))$.concat$(T(\rho_2))$ . . . .concat$(T(\rho_s))$.consolidate( ).distinct( )
where each $T(\rho_i)$, for $1 \leq i \leq s$ is a Rust expression, as specified further below, where each relation symbol is pre-fixed with &, which declares that it should be used as a pointer to the respective relation (i.e., Rust collection). $T^-(\rho_1)$ is obtained from $T_{(\rho_1)}$ by dropping the first & symbol. This makes sure that also for non-recursive predicates $\pi$, $Tr^*(\pi)$ starts with a real relation and not with a pointer (as it is also the case for recursive relations).

The concat operator acts as a multiset union. The ".consolidate( ).distinct( )" operator application at the end of this multiset union transforms the resulting multiset into a classical set where each element occurs only once with multiplicity 1.

Note: In the special case that s=1, $Tr^*(\pi)$ is simply "$T^-(\rho_1)$.consolidate( ).distinct( );".

Figure 6:
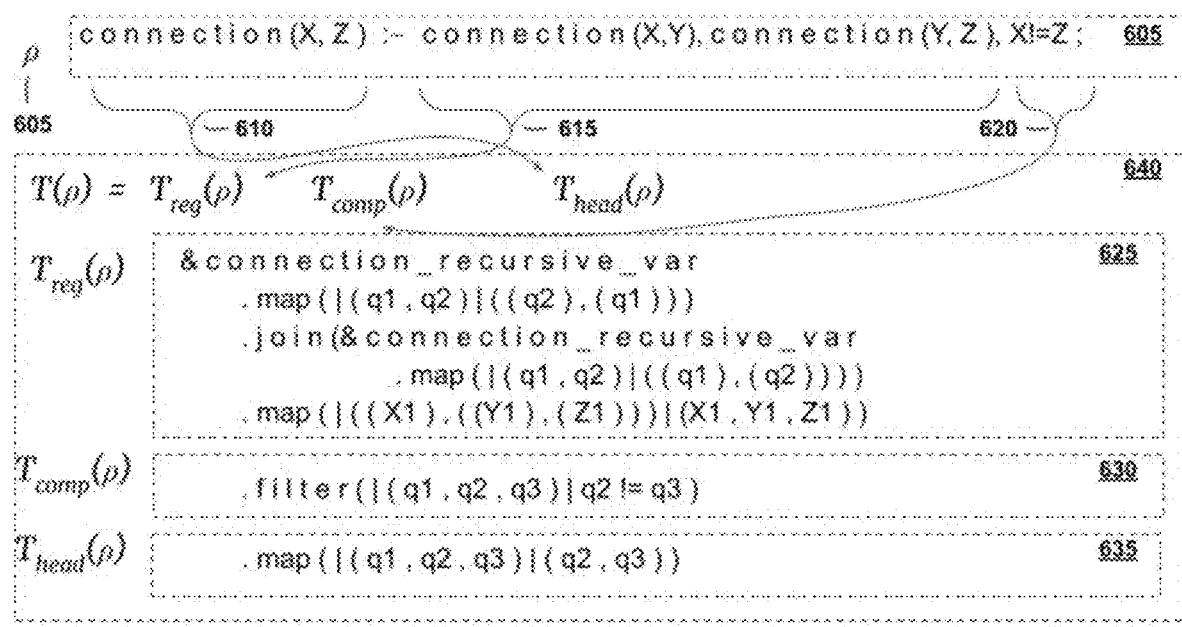
FIG. 6 is an example of the core translation of some EE-Deltalog rule which does not contain some existential variable, but additional filter criteria according to an example of the instant disclosure.

(d) As shown in FIGS. 6 and 7, for an EE-Deltalog rule $\rho$ (for example 605 & 705), $T(\rho)$ consists of the sequence of three parts of Rust code: $T_{reg}(\rho)$ $T_{comp}(\rho)$ $T_{head}(\rho)$ (for example 610, 615, and 620, or 710 and 715). Before these pieces of Rust code are specified, a short explanation of their role is given.

$T_{reg}(\rho)$ translates the (one or two) regular atoms of the rule body to corresponding Rust code where (i) appropriate filters are generated for constants in argument positions or for variables occurring more than once in an atom, and (ii) a join is performed in case the body of $\rho$ contains two regular atoms (625, or 725).

$T_{comp}(\rho)$ transforms comparison atoms in corresponding Rust filter expressions (630).

$T_{head}(\rho)$ uses a "map" operation to adapt the result to the argument structure of the head atom (e.g. projects out columns corresponding to variables that do not appear in the head, and arranges the remaining columns in the right order), and creates fresh null values as instantiations of existential head variables, if any. The latter is done by using and incrementing the null_counter variable to use a different new value for each instantiation of the non-existential head variables (635 and 730).

The code parts $T_{reg}(\rho)$, $T_{comp}(\rho)$, and $T_{head}(\rho)$ are now described in detail.

If $\pi$ is a predicate symbol, then $\pi^*$ is defined to be &$\pi$ if $\pi$ is nonrecursive, and to be &$\pi$_recursive_var if $\pi$ is recursive.

For example, for the FlightConn program, where connection is the only recursive predicate symbol, the above definition works as follows: direct*=&direct, country*=&country, aux*=&aux, connection*=&connection_recursive_var, and labeled*=&labeled.

For each regular atom $A=\pi(t_1, \ldots t_k)$ in the body of $\rho$, let $[A]=[\pi(t_1, \ldots t_k)]$ denote the rust code $(\pi^*$.filter(|$(p_1,\ldots,p_k)$|$\Gamma$), where $\Gamma$ is a list of conditions connected by the && Rust logical "and" operator, containing condition $p_i$=="$\kappa$" whenever $t_i=\kappa$ for some constant $\kappa$, and $p_i==p_j$ for $i \leq j$ if $t_i$ and $t_j$ are the same variable.

Example: Consider an atom A of the form a(X,Y,X,a,b), where a is a nonrecursive predicate symbol. Then [A] and [a(X,Y, X, a, b)] denote the Rust code
a.filter(|(p1, p2, p3, p4, p5)|p1==p3 && p4==a && p5==b)

The definition of $T_{reg}(\rho)$ distinguishes two cases.

CASE 1: The body of rule $\rho$ contains a single regular atom only.

In this case, if A demotes this single regular atom, $T_{reg}(\rho)$ is defined to be [A].

CASE 2: The body of rule $\rho$ contains two regular atoms, an $\alpha$-ary atom A, and a $\beta$-ary atom B. Assume $A=a(s_1, \ldots, s_\alpha)$ and $B=b(t_1, \ldots, t_\beta)$ where $s=s_1, \ldots, s_\alpha$ and $t=t_1, \ldots, t_\beta$ stand for the arguments (constants or variables) of A and B.

Note that for some i, j with $1 \leq i \neq j \leq \alpha$, $s_i$ and $s_j$ may denote the same variable or constant. Similarly, for some i,j with $1 \leq i \neq j \leq \beta$, $t_i$ and $t_j$ may denote the same variable or constant.

Let $x=x_1, \ldots x_\gamma$ be the list of distinct joint variables of A and B (that is, the list of distinct variables that jointly occur in both A and B), and let $y=y_1, \ldots y_\delta$ be the list of distinct variables occurring only in A and let $z=z_1, \ldots, z_\epsilon$ be the list of distinct variables occurring only in B. The order of the variables in each list x, y, and z follows the order of the same variables in the list $st=s_1, \ldots, s_\alpha, t_1, \ldots, t_\beta$. For example, $x_1$ denotes the first variable from left to right in st which occurs both in A and in B, $x_2$ denotes the second, and so on. In a similar way, $y_1$ denotes the first variable from left to right in st which occurs only in A, $y_2$ the second, and so on, and $z_1$ denotes the first variable from left to right in st which occurs only in B, $z_2$ the second, and so on.

For example, consider a rule $\rho_a$ whose body contains the two regular atoms: A: a(X,Y,U,X,V) and B: b(X,X,W,U). Then $x=<x_1,x_2>=<X, U>$; $y=<y_1, y_2>=<Y, V>$; and $z=<z_1>=<W>$. The symbols "<" and ">" are merely textual metasymbols for delimiting the start and the end of lists; they do not effectively occur with these lists in Datalog or in Rust code.

Let u and v be lists of terms (variables or constants), where each term from v also occurs in u, and let i be an element position in list v (where, thus, $1 \leq i \leq$length of v). Then $\sigma[u,v](i)$ denotes the position of the first occurrence of i-th term of v in u.

Example: If, as in the above example, s=<X,Y,U,X,V> and t=<X, X, TV, U>, x=<X, U>, y=<Y,V>, and z=<W>, then, for instance, σ[s,x](1)=1 and σ[s, x](2)=3 because the element at position 1 of x, namely, the variable X, first occurs at position 1 in s, and because the element at position 2 of x, namely, the variable U, first occurs at position 3 in s. A few other illustrations of the above definition are: σ[s,y](1)=2, σ[s,y](2)=5, σ[t,z](1)=3.

The two atoms A and B in the body of rule ρ will be translated into a Differential Dataflow Join between the corresponding relations. Such joins require the prior representation (and re-organization) of the columns of the relations corresponding to A and to B as key-value pairs KVA: ((k), (va)) and KVB: ((k), (vb)), respectively. This is formally defined as follows:

KVA is the following Rust expression:
[A].map(|(q1, . . . ,qα)|((qσ[s, x, 1], . . . , qσ[s, x, γ]), (qσ[s, y, 1], . . . , qσ[s, y, δ])))

Similarly, KVB is the following Rust expression:
[B].map(|(q1, . . . ,qβ)|((qσ[t, x, 1], . . . , qσ[t, x, γ]), (qσ[s, z, 1], . . . ,qσ[s, z, ε])))

In both, KVA and KVB, the qi can be considered lambda-bound variables (in the sense of the Lambda Calculus) of local scope within the respective "map" command, that range over the columns of the relations corresponding to [A] (and thus also to A) and to [B] (and thus also to B), respectively. For KVA, the map operation simply projects columns corresponding to distinct variables of A, and re-arranges them into a key-value pair ((k), (va)) where the "key columns" k are those corresponding to the variables of the list x, i.e., the joint variables of A and B, and into the so-called "value list" va of those columns that correspond to those variables that occur in A but not in B. Similarly, for KVB, the map operation projects those columns corresponding to distinct variables of B, and re-arranges them into the key-value pair ((k), (vb)), where k are those columns corresponding to the variables of the same variable list x, and into a "value list" vb of those columns that correspond to the variables that occur in B but not in A.

$T_{reg}(\rho)$ for CASE 2 is then computed as:
KVA.join(&KVB)
.map(|((X1, . . . , Xγ)((Y1, . . . , Yδ)(Z1, . . . , Zε)))|(X1, . . . , Xγ, Y1, . . . ,Yδ, Z1, . . . , Zε))

The map operation in the above expression transforms the result of the join, whose schema is of grouped type ((key) (value_KVA)(value_KVB)) into a flat schema containing first all column names of the key, followed by the column names of the remaining (i.e., "value") attributes of KVA followed by the remaining (i.e., "value") attributes of KVB.

Example. Consider, a rule ρ whose two regular atoms are A: a(X,Y,U,X,V) and B: b(X,X,W,U). Then, similar as in examples above, s=<X,Y,U,X,V>, t=<X, X, TV, U>, x=<X, U>, y=<Y, V>, and z=<W>. Assume, furthermore, that a is a non-recursive predicate symbol, while b is recursive. $T_{reg}(\varphi)$ is then, by definition, computed as:
a.filter(|(p1,p2,p3,p4,p5)|, p1==p4)
  .map(|(q1,q1,q3,q4,q5)|((q1,q3),(q2,q4,q5)))
  .join
  (&b_recursive_var.filter(|(p1,p2,p3,p4)|p1==p2)
  .map(|(q1,q1,q3,q4)|((q1,q4),(q3))))
  .map(|((X1,X2)((Y1,Y2)(Z1)))|(X1,X2,Y1,Y2,Z1))

Note: In case lists consist of a single element, the surrounding parentheses may normally be omitted. Thus, for instance, a simple variant of the described EE-Deltalog to Rust compiler may output "q3" instead of "(q3)" in the fifth line of the above code. The policy of not omitting parentheses for lists with single elements, as adopted in the present translation, is perfectly logical and correct, and was chosen for uniformity reasons. This may produce warnings in certain Rust compilers, which can be safely disregarded.

It is important to retain that, in CASE 2, by definition of the Differential Dataflow join operator, the columns of the relation computed by the rust code $T_{reg}(\rho)$ applied to relations a and b correspond to the list of variables xyz which is the concatenation of the lists x, y, and z as defined above.

This concludes the description of how to compute $T_{reg}(\rho)$.

Next, the description of how to compute $T_{comp}(\rho)$ is given.

If ρ has no comparison atoms, then $T_{comp}(\rho)$ is empty, and thus disregarded. Otherwise, assume now, that the rule body ρ has k comparison atoms $\theta_1, \ldots, \theta_k$, each of the form X⊙t, where X is a variable occurring in a regular atom of the body of ρ and t is either a constant or another variable occurring in a regular atom of the body of ρ, and where ⊙ is an infix operator among "=", ">", "<", ">=", "<=", "!=".

$T_{comp}(\rho)$ is then the filter expression
.filter(|(q1, . . . , ql)|$f(\theta_1)$ && && $f(\theta_k)$)
where l is the number of columns in the relation defined by $T_{reg}(\rho)$, and where $f(\theta_i)$ will be defined further below.

If U is a variable in the body of ρ, then the column number #[U, ρ] corresponding to U in $T_{reg}(\rho)$ is defined as follows:

In case ρ has only one regular body atom as in CASE 1 above, say, A=a($v_1, \ldots, v_n$), then, #[U, ρ] is the position of the first occurrence of U in the list <$v_1, \ldots, v_n$>, formally, #[U, ρ]=σ[<$v_1, \ldots, v_n$>, <U>, 1].

Otherwise, if ρ has two regular body atoms A=a($s_1, \ldots, s_\alpha$) and B=b($t_1, \ldots, t_\beta$) as in CASE 2 above, and if the lists x, y and z are defined as above, then #[U, ρ] is the (unique) position of U in the list xyz which, as noted before, is in correspondence with the columns of $T_{reg}(\rho)$. Formally, #[U, ρ]=σ[xyz, <U>, 1].

$f(\theta_i)$ is defined as follows:

If $\theta_i$ is of the form X⊙c, where X is a variable and c is a constant, then $f(\theta_i)$=q#[X, ρ]⊕c, where ⊕ is the Rust comparison operator corresponding to the EE-Deltalog comparison operator ⊙. (For example, if ⊙ is "=", then ⊕ is "==".)

If $\theta_i$ is of the form X⊙Y, where X and Y are both variables, then $f=(\theta_i)$=q#[X, ρ]⊕q#[Y, ρ], where ⊕ is defined as above.

Note also that (while not necessary in EE-Deltalog), string constants are put between double-quotes in Rust, which the translation $T_{comp}(\rho)$ will do wherever necessary. For example the data constant usa of the FlightConn program will be translated to "usa" (i.e., use in double quotes).

This concludes the description of how $T_{comp}(\rho)$ is computed.

Example. Consider, a rule ρ whose body is
a(X,Y,U,X,V), b(X,X,W,U), V<=W, Y!=6
and note the regular atoms are the atoms A and B of the above example, and thus x=<X, U>, y=<Y, V>, and z=<W>, and thus xyz=<X, U, Y, V W>. Thus $f$(V<=W) is "q4<=q5" and $f$(Y!=6) is "q3!=6". Thus, $T_{comp}(\rho)$ is computed as:
.filter(|(q1, . . . , q5)| q4<=q5 && q3!=6)

Finally, the description of how to compute $T_{head}(\rho)$ is given. $T_{head}(\rho)$ is a piece of code that is applied to the result of "$T_{reg}(\rho)T_{comp}(\rho)$" to project out those columns that correspond to variables in the head of ρ, and, in addition, to create columns for the existentially quantified variables and constants in the head of ρ.

To describe the transformation, assume the head H of ρ has the (generic) form H=h($h_1, \ldots, h_v$), where h is a predicate symbol and each $h_i$, for 1≤i≤v $h_i$ is either a variable that also occurs in the body of ρ, or an existentially quantified variable of the form $Z, or a constant.

Let, as in the description of $T_{comp}$, l be the number of columns of the relation associated with $T_{reg}(\rho)$, and thus also with $T_{reg}(\rho)T_{comp}(\rho)$, and let, for each variable U in the body of ρ, #[U, ρ] be defined as before, i.e., #[U, ρ] denotes the number of the row corresponding to U in the relation defined by $T_{reg}(\rho)$, and thus also in the one defined by $T_{reg}(\rho)T_{comp}(\rho)$.

Denote by κ the number of distinct existentially quantified variables in the rule head of ρ. Thus, if this head is, for example, h(X,$T, $Z, Y, $T, 7), then κ=2. Moreover, for the i-th distinct head variable $ξ, define ord[$ξ, ρ]=i. For the above example rule head, we thus have: ord[$T, ρ]=1 and or d[$Z, ρ]=2.

For 1≤ß≤v, define $\Gamma_i(\rho)$ as follows:
If the i-th argument $h_i$ of the head of ρ is a constant k, then $\Gamma_i(\rho)$=k.
If $h_i$ is a variable ξ also occurring in the rule body, then $\Gamma_i(\rho)$=q#[ξ, ρ].
If $h_i$ is an existentially quantified variable $ξ, then $\Gamma_i(\rho)$=format!("null_{ }", value+ord[ξ, ρ]−1), where format ! is a so-called Rust macro (a function) which formats strings; i.e. it will return strings of the form "null_v", where v is the integer computed as "value+ord[ξ, ρ]−1". Here, "null_v" is a Rust string value of which the double-quotes are part of, and v is a placeholder for the computed numeric value, as indicated. Note that it is assumed that a string of the form "null_i" is not used anywhere else in the input program P, otherwise it is straightforward to use a different encoding of null values (Skolem constants).

For a rule ρ that does not contain existentially quantified variables in the rule head, $T_{head}(\rho)$ is defined to be the Rust expression ".map(|(q1, . . . ,ql)|($\Gamma_1(\rho)$, . . . $\Gamma_v(\rho)$))".

For a rule ρ, which contains existential variables in the rule head, $T_{head}(\rho)$ is defined to be the Rust expression
.map(move|(q1, . . . ,ql)|{let value=null_counter;
  null_counter=value+κ;
  let arg1=$\Gamma_1(\rho)$; . . . ; let argv=$\Gamma_v(\rho)$;
  return(arg1, . . . ,argv)

This concludes the description of the translation $T_{head}$, and thus also of the transformations TR* and T used in STEP 3.2 (530) is further described below using examples.

As a first example, assume p is the following rule whose head and body have already been considered in previous examples:
h(X,$T, $Z, Y, $T) a(X, Y, U, X, V), b(X, X, W, U), V<=W, Y!=6;
where a is a non-recursive and b a recursive predicate symbol. Recall that the list of columns of the relation computed by $T_{reg}(\rho)T_{comp}$ correspond to the list of variables xyz=<X, U, Y, V, W>

For this ρ, κ=2 and $T_{head}(\rho)$ is:
.map(move |(q1,q2,q3,q4,q5)| {let value=null_counter;
  null_counter=value+2;
  let arg1=q1;
  let arg2=format!("null_{ }", value+1-1);
  let arg3=format!("null_{ }", value+2-1);
  let arg4=q3;
  let arg5=format!("null_{ }", value+1-1);
  return(arg1,arg2,arg3,arg4,arg5)

Therefore, the entire translation $T(\rho)=T_{reg}(\rho)\ T_{comp}(\rho)\ T_{head}(\rho)$ is:
&a.filter(|p1,p2,p3,p4,p5|,p1=p4)
  .map(|(q1,q1,q3,q4,q5)|((q1,q3),(q2,q4,q5)))

.join
  (&b_recursive_var.filter(|p1,p2,p3,p4|p1=p2)
    .map((|q1,q1,q3,q4)|((q1,q4),(q3))))
.map(|((X1,X2)(Y1,Y2)(Z1))|(X1,X2,Y1,Y2,Z1)) .filter(|
  (q1,q2,q3, q4,q5)|q4<=q5 && q3!=6)
.map(move |(q1,q2,q3,q4,q5)| {let value=null_counter;
  null_counter=value+2;
  let arg1=q1;
  let arg2=format!("null_{ }", value+1-1);
  let arg3=format!("null_{ }", value+2-1);
  let arg4=q3;
  let arg5=format!("null_{ }", value+1-1);
  return(arg1,arg2,arg3,arg4,arg5)

The second example for code generated by STEP 3.2 shows the translations of each predicate of the FlightConn EE-Deltalog program. It starts with Tr(connection), which is followed by Tr(aux) and Tr(labeled).
  let connection=
    connection
    .concat(&direct.map(|(q1, q2)| ((q1, q2)( )))
      .join(&aux_recursive_var.map(|(q1,q2)|((q1,q2)( ))))
      .map (|((x1, x2), ( ), ( ))|(x1, x2)))
    .concat(&connection_recursive_var.map(|(q1, q2)|(q2, q1)))
    .concat(&connection_recursive_var
      .map(|(q1,q2)| ((q2),(q1)))
      .join(&connection_recursive_var.map(|(q1,q2)
        ((q1),(q2))))
      .map((X1), ((Y1), (Z1)))|(X1,Y1, Z1))
      .filter(|q1,q2,q3)|q2 !=q3)
      .map(|(q1,q2,q3)|(q2,q3)))
    ).consolidate( ).distinct( );
  let aux=
    country
      .filter (|(q1, q2)|q2=="usa")
      .map(|(q1,q2)|(( ), (q1,q2)))
      .join(&country
        .filter(|(q1,q2)|q2=="usa")
        .map (|q1,q2|(( ) (q1,q2))))
      .map(|(( ), ((Y1,Y2), (Z1, Z2)))|(Y1,Y2,Z1,Z2))
      .map(|(q1, q2, q3, q4)|(q1,q3))
      .consolidate( ).distinct( );
  let labeled=
    connection_recursive_var
      .map(move (q1, q2)
        {let value=null_counter;
        null_counter=value+1;
        let arg1=q1;
        let arg2=q2;
        let arg3=format!("null_{ }", value+1-1);
        return (arg1, arg2, arg3)})
      .consolidate( ).distinct( );

Details of Step 3.3 (540)

In the final part of Step 3, all IDB relations $idb_1, \ldots, idb_n$ are returned to the outer level of the recursive loop by issuing the return statement below. Each $idb_i$ returned to the outer scope is obtained via a statement $idb_i$_recursive_var.set(&$idb_i$).leave( ), which is a sequence of the function calls set(&$idb_i$) and leave ( ). First, $idb_i$_recursive_var.set(&$idb_i$), sets $idb_i$ as source of data for the recursive variable $idb_i$_recursive_var, returning a collection on which then the leave( ) function is called, eventually returning the final value of the collection representing $idb_i$ from the recursive loop to the main outer scope.

```
return (
    idb₁_recursive_var.set(&idb₁).leave( ),
    ...
    idbₙ_recursive_var.set(&idbₙ).leave( ));
```
The Rust code generated and added by STEP 3.3 for the FlightConn example program is as follows:
```
connection_recursive_var.set(&connection).leave( );
aux_recursive_var.set(&aux).leave ( ),
labeled_recursive_var.set(&labeled).leave ( ));
```

Step 4: Creation of the <Closing> Code Block (440)

STEP 4 First closes the brackets "({" of the iterative scope (opened via scope.iterative), then returns for the EDB relations $edb_1, \ldots, edb_m$ the corresponding input sessions $edb_1\_in, \ldots, edb_m\_in$ and finally closes all remaining open parentheses and curly brackets:

Part of Differential Dataflow, these input sessions are objects which provide methods in order to insert (or remove) tuples into (or from) its associated EDB relation. They are meant to be used outside the dataflow and represent the only way to insert (or remove) data from outside the dataflow.
```
        });
        return (edb₁_in, . . . , edbₘ_in);
    });
});
}
```

Explanation: The first of the five above lines closes the fixed-point loop opened with the piece of code "|fixed_point_loop| {" introduced in STEP 3.1 (520). The second line returns the input sessions as described above, for each of the EDB predicates $edb_1\_in, \ldots, edb_m\_in$. The third line closes the "(" and "{" opened with the piece of code "worker.dataflow(|scope| . . . ". The fourth line closes the "(" and "{" opened with the piece of code "timely::execute_from_args(std::env::args( ), |worker|{" introduced in STEP 1 (410). The last line closes the function "main" introduced with the piece of code "fn main( ) {" in STEP 1 (410).

The Rust code generated and added by STEP 4 (440) for the FlightConn example program is as follows:
```
        });
        return (direct_in, country_in);
    });
});
}
```

With this, the four blocks <Preamble>, <Declarations>, <Central Code>, and <Closing> of the translation Tr(P) of any EE-Deltalog program P (having by assumption at most two regular atoms in each clause body) have been fully specified with the given four translation steps STEP 1-STEP 4 (410-440). Therefore, the translation function Tr has been fully explained, and, given this teaching, the compiler Tr can be easily implemented in various programming languages by anybody skilled in the art.

The precise code blocks for Tr(FlightConn) were given stated as examples. Therefore, by concatenating these blocks, the full code of Tr(FlightConn) can be obtained. This is done below.

The full code of the translation Tr(FlightConn)

The full code of Tr(FlightConn) is listed here below. A comment line for heading each code block was inserted for better readability.
```
// - - - - Code block <Preamble> generated by STEP 1 -
    - - -
extern crate timely;
extern crate differential_dataflow;
use std::io;
use differential_dataflow::input::{Input};
use differential_dataflow::operators::{Join, Consolidate,
    Threshold};
use differential_dataflow::operators::iterate::Variable;
use timely::dataflow::Scope;
use timely::order::Product;
fn main( ){
    timely::execute_from_args(std::env::args( ), |worker| {
// - - - - Code Block <Declarations> generated by STEP
    2 - - - -
    let (mut direct_in, mut country_in)=worker.dataflow
        (|scope| {
        let (direct_in, direct)=scope.new_collection
        let (country_in, country)=scope.new_collection
        let (_, connection)=scope.new_collection
        let (_, aux)=scope.new_collection
        let (_, labeled)=scope.new_collection
// - - - - Code block <Central Code> generated by STEP
    3 - - - -
    let (connection, aux, labeled)=
scope. iterative::<u64, _>(|fixed_point_loop| {
    let mut null_counter=0;
    let direct=direct.enter(fixed_point_loop);
    let country=country.enter(fixed_point_loop);
    let connection=connection.enter(fixed_point_loop);
    let aux=aux.enter(fixed_point_loop);
    let labeled=labeled.enter(fixed_point_loop);
    let connection_recursive_var=
        Variable::new_from (connection.filter (|_| false),
        Product::new(Default::default ( ), 1));
    let aux_recursive_var=
        Variable::new_from(aux.filter (|_| false),
        Product::new(Default::default( ), 1));
    let labeled_recursive_var=
        Variable::new_from(labeled.filter(|_| false),
        Product::new(Default::default ( ), 1));
    let connection=
    connection
        .concat(&direct.map(|(q1, q2)| ((q1, q2)( )))
            .join(&aux_recursive_var.map(|(q1, q2)| ((q1, q2)(
            ))))
            .map(|((x1, x2), (( ), ( ))|(x1, x2)))
        .concat(&connection_recursive_var.map(|(q1,q2)| (q2,
            q1)))
        .concat(&connecton_recursve_var.map(|(q1,    q2)|
            ((q2),(q1))))
            .join(&connection_recursive_var.map(|(q1,    q2)|
            ((q1),(q2))))
            .map(|((X1), ((Y1), (Z1)))|(X1,Y1, Z1))
        .filter(|(q1,q2,q3)| q2 !=q3)
        .map(|(q1,q2,q3)| (q2,q3)))
            .consolidate( ).distinct( );
    let aux=
        country
            .filter(|(q1, q2)|q2=="usa")
            .map(|(q1,q2)|(( ).(q1,q2)))
            .join(&country
                .filter(|(q1, q2)|q2=="usa")
                .map(|q1,q2|(( ), (q1,q2))))
            .map(|(( ), ((Y1,Y2), (Z1,Z2)))|(Y1,Y2,Z1,Z2))
            .map(|(q1, q2, q3, q4)|(q1,q3))
            .consolidate( ).distinct( );
    let labeled=
        connection_recursive_var
            .map(move (q1,q2)
                {let value=null_counter;
                null_counter=value+1;
                let arg1=q1;
```

```
        let arg2=q2;
        let arg3=format!("null_{ }", value+1-1);
        return (arg1, arg2, arg3)})
    .consolidate( ).distinct( );
return (
    connection_recursive_var.set(&connection).leave ( ),
    aux_recursive_var.set(&aux).leave ( ),
    labeled_recursive_var.set(&labeled).leave( ));
// - - - - Code block <Closing> generated by STEP 4 - - -
});
// - - - - Code block <Application-Output>
return (direct_in, country_in);
});
// - Code block <Application-Input>
});
}
```

Insertion of Application Code

The detailed translation Tr(P) for some datalog program P, given in the previous sections, is the core of the target program realizing the program logic of P. However, this core usually is augmented (technically as code inclusion, or linked and implemented in separate code libraries) with individual application code which implements specific input and output logic; i.e. how input updates are ingested, and output updates are provided.

Thus, in what follows, these two aspects of providing input data and consuming outputs will be outlined. This is done separately since each of the outlined approaches for ingesting data can be combined with any of the approaches given for consuming data.

Output Handling

In the above code of the full core translation Tr(Flight-Conn), the placeholder <Application-Output> is used to indicate that any of the following examples can be inserted at exactly this position to realize a different output behaviour. The special operator inspect is used on each of the collections corresponding to an IDB relation, in order to apply an individual (arbitrary) code per triple in this collection, but not changing the collection itself. The schematic usage is:

```
idb_i.inspect (|(data, time, mul)|{
    // <OUTPUT CODE>
});
```

In contrast to (all) other operators, the inspect operator gives access not only to the data part of the triples in a collection, but to the full triple (Data, Time, Multiplicity).

Primitive Print Output

The first very simple application is printing each output stream for each of the IDB relations. For the IDB relations connection and labeled from the FlightConn datalog program, the following two statements simply print each triple (Data, Time, Multiplicity) to standard output such that one can directly observe the output.

```
labeled.inspect(|(data, time, mul) {
    println!("labeled {:?} Time={ } Multiplicity={ }",
        data, time, mul)
});
connection. inspect (|(data, time, mul)| {
    println!("connection {:?} Time={ } Multiplicity={ }",
        data, time, mul)
});
```

For the connection relation, this would, for example, produce output lines alike:

. . .
connection ("new york", "washington") Time=0 Multiplicity=1
connection ("washington", "miami") Time=0 Multiplicity=1
connection ("miami", "houston") Time=0 Multiplicity=1

Maintaining RDBMS Tables

Typically, one would like to get a consistent view of the current state of some relation of interest. The previous "Print Output" approach would merely provide the sequence of changes of the IDB relation of interest, but not its current state in terms of all tuples which are present at this moment. This can be achieved by maintaining a data structure which reflects the current state, and can be realized by updating the data structure in terms of insertions or deletions according to the multiplicity while inspecting the output.

To exemplify this, one can think of (initially empty) tables $t\_idb_i, \ldots, t\_idb_n$, in some RDBMS system, for each of the IDB relations $idb_i, \ldots, idb_n$. Then, for any update (Data, Time, Multiplicity) in some IDB relation $idb_i$, it is possible to replicate the change in its corresponding table $t\_idb_i$ by issuing the appropriate SQL statement (given that SQL is the interface language for the chosen RDBMS). As it has been shown in the translation, it is ensured that the multiplicity is at most 1, in order to adhere to a set semantics. Thus, by distinguishing the two possible multiplicity values 1 (addition), and −1 (Deletion) one can directly issue the corresponding INSERT or DELETE statement. Briefly sketched, for any IDB relation $idb_i$ this can be realized as follows:

```
idb_i.inspect (|(data, time, mul)| {
    if mul==-1 {
        // Delete record "data" from table t_idb_i
    } else {
        // Insert record "data" to table t_idb_i
    }
});
```

Moreover, it is possible to improve (i.e. lower) the transaction rate by batching or grouping all updates of the same time into one transaction covering possibly many INSERT and DELETE statements.

Another benefit of this is also, that users can formulate queries (in SQL for example), over the tables in the RDBMS to simply inspect, or build more advanced applications on top which required up to date data.

Middleware Stream Data Output

Modern software architectures rely heavily on event, or data driven principles where the events (or the data) arrive in contiguous streams. EE-Deltalog queries can be seen as streaming processors, which continuously evaluate an EE-Deltalog query (program) over changing input data, and produce a continuous stream of result updates. Thus, it is straight forward to ingest tuples of some IDB relation directly into a dedicated streaming channel, for example, a Kafka topic.

```
idb_i.inspect (|triple| {
    kafka_topic_i_client.send(triple);
});
```

Data Ingestion

In the above code of the full core translation Tr(Flight-Conn), the placeholder <Application-Input> is used to indicate that any of the following examples can be inserted at exactly this position to realize a different way of obtaining input data.

The translation Tr(P) of some program P foresees returning one input session for each EDB relation in P. In the translation of the FlightConn example, these input sessions are direct_in, and country_in, which are available outside the dataflow, and allow to ingest data (both adding and removing). To demonstrate the working mechanics of input sessions, the first example of ingestion is static (hard-coded)

data, which is not of practical use for a real application, but show the usage of the input sessions.

The following code snippet first advances the timestamp of the direct_in input session to 0, which tells the differential dataflow to expect only data arriving later than time 0 from now on. In the second and third line, the tuples ("berlin", "london") and ("london", "nyc") are inserted via the "insert" method of the input session. It is then done similar for the EDB relation "country" via its associated input session "country_in".

```
direct_in.advance_to (0);
direct_in.insert(("new york".to_string,
    "washington".to_string( )));
direct_in.insert(("washington".to_string,
    "miami".to_string ( )));
country_in.advance_to(0);
country_in.insert(("new york".to_string( ),
    "usa".to_string( )));
country_in.insert(("washington".to_string( ),
    "usa".to_string ( )));
country_in.insert(("miami".to_string( ),
    "usa".to_string ( )));
```

The above insertions would yield immediate output corresponding to timestamp 0. Adding the following lines additionally, would result in subsequent output associated with timestamp 1.

```
direct_in.advance_to (1);
direct_in.insert(("miami".to_string( ),
    "houston".to_string ( )));
country_in.advance_to (1);
country_in.insert(("houston".to_string,
    "usa".to_string ( )));
```

Thereafter, as example, one could retract previously inserted tuples via an input sessions "remove" method. For example, the following code would retract the previously inserted tuple ("washington", "miami"), and associate this (deletion) update with timestamp 2, telling differential dataflow not to expect any updates (insertions or deletions) with timestamp 1 anymore.

```
direct_in.advance_to(2);
direct_in.remove(("washington".to_string,
    "miami".to_string ( )));
```

Using these simple mechanics, one could think of many possible ways to ingest data from various source types, or source systems, which very briefly described could be one of the following:
  File-based: Given the above, it straight forward to obtain data for each, or some, EBD relations from dedicated files, possibly in dedicated or standard file formats (e.g. as comma-separated values file (CSV)). Most notably, one might want to bulk load the entire file content into some EDB relation $edb_i$, and thus would associate all the corresponding "$edb_i$_in.insert( . . . )" insertion calls with the same timestamp. Another strategy could possibly be, to batch a certain number of lines and associate a timestamp with each batch.
  Middleware: As shown for the case of writing query results into middleware streaming platforms, such as Apache Kafka, it is as well possible to obtain input in the very same way, continuously listening (polling) on one or more streaming channels and ingest After this discussion and many examples of how various types of application code, it is worth noting that application code insertion is not the only way to connect the code Trans(P), where "Trans(P)" is used here to refer in a more general way to the code resulting from a translation from an Existential Datalog program to a target language augmented by Differential Datalog constructs and operators. (In the above described example, Trans(P)=Tr(P)). For example, Trans(P) may be linked to external code, which does not need to be explicitly inserted. This external code may have access to the memory space used by Trans(P) for storing collections, and may thus be able to access and further process the collections generated or maintained by Trans(P) directly, and to perform I/O and other actions. Yet other embodiments, instead of inserting application code into Trans(P), may embed Trans(P) in some fixed application code.

Main Principles and Possible Variations of the Basic Translation Tr(P)

The above disclosed translation "Tr" from EE-Deltalog to a Rust-based Differential Datalog framework is an exemplary and one that, in a sense, can define the basics of a minimum viable solution. It was made as simple as possible to meet didactic purposes.

The underlying principles of the disclosed translation can be abstractly summarized as follows 1. Where appropriate, the translation may perform pre-processing steps to the input Existential Datalog program.
2. The translation transforms an Existential Datalog program P into a Differential Dataflow framework that augments a "target" programming language (as an example, Rust) enriched by Differential Dataflow constructs and operators.
3. The translation generates appropriate declarations and initializations of variables, including a global null counter of integer type, which is initialized to some value (e.g., to zero) and which serves for the generation of fresh null values (aka Skolem constants).
4. The translation contains a Differential Dataflow "iterative" loop to compute the value of IDB relations.
5. For each IDB relation r to be computed inside the iterative loop, the translation gives rise to a chain of Differential Dataflow concatenations using the Differential Dataflow "concat" operator. This first element of this chain represents an empty instance of r. To this first element, a translation of each rule of P whose head predicate is r is concatenated. In order to eliminate duplicates, the commands "consolidate( )" and "distinct( )" are appended to this chain of concatenations.
6. The translation of each rule can be divided into three parts: (a) a part translating occurrences of constants and multiple occurrences of a same variable in regular body atoms by using appropriate Differential Dataflow "filter" operators, and for expressing the occurrence of multiple regular atoms in rule bodies by using Differential Dataflow "join" operators, where, in addition, Differential Dataflow "map" operators are used for necessary schema-conversions, in particular, to structure the schemas of the join operands into key-value pairs (as required for Differential Dataflow join operators) and for re-converting (i.e., "flattening") the structured schemas of join results to unstructured "flat" schemas. (b) A part for expressing constraints imposed by comparison atoms in the rule body by appropriate Differential Dataflow "filter" operators. (c) A part for expressing the output of a rule (corresponding to the rule's head atom) by using an appropriate Differential Dataflow "map" operation. In case of existential variables in the rule head, this "map operator" generates a fresh null (Skolem constant) for each such variable by using and incrementing the null counter. (In the Rust implementation of Differential Dataflow, this also requires the specification of the Rust-specific "move" keyword).

7. Application-specific code written in the target programming language augmented by Differential Dataflow constructs and operators can be inserted into appropriate places of the code generated by the translation.

For example, in some embodiments, Datalog programs with more than two regular atoms in rule bodies do not need to be pre-processed and translated into programs with at most two regular atoms per rule body. Rather, a translation that directly deals with three or more regular atoms can be devised based on similar principles. In this case, no auxiliary predicates need to be used for splitting rule bodies, which may lead to a faster and more space-efficient program execution.

For reasons of a simpler exposition of the translation, in EE-Deltalog, null-ary (i.e., propositional) predicate symbols were disallowed. However, those skilled in the art can see that there is no conceptual difficulty connected to null-ary predicates and that null-ary predicates can be easily dealt-with. A solution would be to transform in a pre-processing step each null-ary atom p into a unary atom p(dummy), where dummy is a dummy constant not used only for this purpose. A better solution is to adapt the translation Tr to cover also the special case of null-ary predicates, which can be readily done.

Another example may use other possible representations of null values, and/or other computational mechanisms for generating null values. The chosen representation of null_i", where i is an integer is just one of a myriad of possibilities. In alternative embodiments, nulls can be represented by Skolem terms (rather than constants) as explained herein. With Skolem terms, not only the representation of generating null values is different, but usually also the mechanism for generating null values. In fact, rather than by augmenting a null counter, a new Skolem term is built directly when a rule is applied, without reference to any null counter, as explained in herein. Yet other examples may include use of a hash or compression function h whose argument is a list of terms to generate fresh nulls. For example, when a rule fires with a matching substitution θ, the null value corresponding to an existential variable Z in the rule head may be $h((\#\rho, \#\pi, \theta(t_1), \ldots, \theta(t_l)))$, where $\#\rho$ is the number (or some other identifier) of the rule, $\#\pi$ is the argument position of Z in the rule head and $t_1, \ldots, t_l$ are the terms that occur in the argument positions of the regular atoms of the rule body. Many variations are possible. Alternatively, instead of a hash or compression function, a random number generator (associated with the target language) can be used, where, for example, an encoding of $(\#\rho, \#\pi, \theta(t_1), \ldots, \theta(t_n))$ as an integer may serve as seed.

For simplicity and uniformity, it is possible to put the code for the evaluation of all IDB predicates into the iterative loop. Actually, it is often not necessary to evaluate the nonrecursive IDB predicates in the iterative loop, and some alternative embodiments may place the code relative to some or all non-recursive predicates of P outside the iterative loop. More sophisticated embodiments may perform careful analysis of the dependency graph DG(P) of the input Existential Datalog program and may use more than one iterative loops (e.g., one for each bi-connected component of DG(P)) and may place the code corresponding to all or some non-recursive predicates outside these loops.

There are many different possible improvements by applying and possibly combining various types of optimizations, extensions, and smart execution strategies. Some of these features and improvements are described in the next sections.

Optimization

Traditional Optimization

Rule bodies are essentially join queries (with selections), and therefore all techniques used for (logical or physical) join query optimization can be applied to the translation of rule bodies of Existential Datalog rules. A standard logical optimization technique is, for example, to shift selections into joins. Physical join optimization re-organizes the join order based on quantitative information such as join selectivity and relation sizes, so that joins that lead with a high probability to a small result are executed first. All these (and many more) optimization techniques can be applied to the translation of a program, especially in embodiments where rules with several regular body atoms are directly translated into expressions with multiple joins. In some cases, specific Datalog optimization techniques such as the well-known "magic sets" program rewriting method may be useful and part of an embodiment.

Hypertree Decomposition

Figure 8:
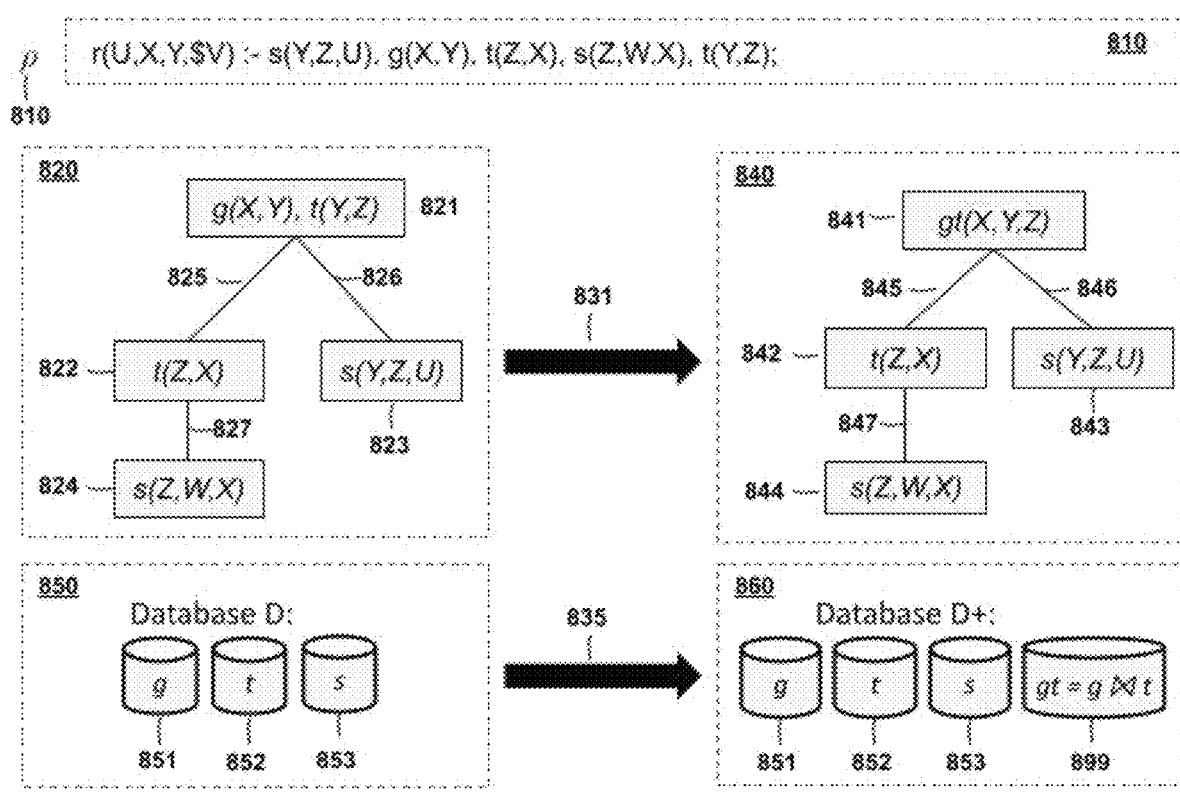
FIG. 8 is an example of the application of Hyptertree-Decomposition on some EE-Deltalog rule, in order to obtain an optimized join execution order according to an example of the instant disclosure.

A hypertree decomposition is a re-organization of a (possibly cyclic) conjunctive query into an acyclic one, followed by a semijoin-reduction program applied to the operands (i.e., the relations to be joined) that reduces these operands by eliminating from each operand each tuple that is irrelevant to the query. Here, "cyclic" and "acyclic" mean, more precisely, "alpha-cyclic" and "alpha-acyclic", respectively. As shown in FIG. 8, in some embodiments, this method may be applied to rule bodies. For example, consider the following rule ρ (810 in FIG. 8) where \$V is an existentially quantified variable R(U,X,Y,\$V):—s(Y,Z,U), g(X,Y), t(Z,X), s(Z,W,X), t(Y, Z);

The conjunctive query CQ(body(ρ)) constituted by the conjunctions of all body atoms of ρ is cyclic and of hypertree-width 2. A generalized hypertree decomposition (GHD) 820 of such a query consists of a tree or possibly a forest whose nodes 821-824 are called "bags" and are sets of atoms of the query, and where every query atom is included in a at least one bag, and whose arcs 825-827 connect the bags in order to form a tree or forest. A GHD further fulfills the following two connectedness condition: For each query atom A, the graph induced by those nodes of the GHD that contain A is connected (and thus a subtree of the GHD). The width of a hypertree decomposition is the cardinality (number of atoms) of any of its largest bags. The decomposition 820 has one largest bag 821 of cardinality 2, hence its GHW is 2. The GHW of a query is the smallest GHW over all its GHDs. In case of the query CQ(body(ρ)) it can be seen that there is no GHD whose width is smaller than 2, hence the GHW of body(ρ) is 2.

Given a conjunctive query ρ with a GHD Γ(ρ) of its body CQ (such as e.g. 820), and a database D, there is an easy transformation 831 that transforms ρ and Γ(ρ) into a rule ρ* with an acyclic body such that the evaluation of ρ over D leads to exactly the same result as the evaluation of ρ* over an augmented database $D^+$. The transformation 831 first creates for each bag B containing multiple atoms (such as 821) a new predicate symbol newpred(B) (in the current example "gt") and an atom for this predicate, with all the variables occurring in the bag (gt(X,Y,Z) in the example). The bag is then replaced by a new bag (841) that contains this atom as a single element. As a result of applying such a replacement to each bag of the original GHD (820), a new GHD Γ*(ρ) (840) has been created, which is actually a join tree representing an acyclic query. Then let ρ* be the rule obtained from ρ as follows. The head of ρ* is equal to the one of ρ. The body of ρ* consists of a comma-separated list (in any arbitrary order) of all atoms appearing in Γ*(ρ)). For the given example, ρ* is R(U,X,Y, The augmented database D⁺ (860) is produced from the original database D (850, having, in our example, an additional relation gt 899) via a transformation 835 that adds to the relations of D (851-853) for each original bag B with multiple atoms a new relation named newpred(B) which consists of the join of all the relations corresponding to predicate names in B (in our example, the new relation gt=g ⋈ t, 899).

The evaluation of ρ* over D⁺ (i.e., the set of all atoms that can be inferred by applications of ρ* to D⁺) is equal to the evaluation of ρ over D. The great advantage of ρ* is that it is an acyclic query, which can be evaluated according to existing special algorithms such as Yannakakis' algorithm for acyclic database schemes and its variants. This makes particularly sense for rule bodies that are of low GHW compared to the number of atoms in the rule body. Some advanced embodiment would thus first compute the GHW of (the CQ corresponding to each rule body), and then replace each rule ρ with the corresponding rule ρ* and add add the relevant relations to D so to obtain D.

The evaluation of each p* over D* can then be done via special code that reduces the relations in the body of ρ* by the semi-join programs (full reducers) according to Yannakakis' algorithm or refinements thereof. This can be implemented by anybody skilled in the art at the level of the translated version of the input program P (thus, e.g. by modifying a Rust Differential Dataflow program Tr(P) by superimposing Yannakakis' algorithm for fully reducing the relations in longer rule bodies having low GHW). In cases of very long rule bodies, the computation of the GHW and of a corresponding GHD of the rule body may be too complex, as these are NP hard problems. In this case, instead of GHW and GHDs, hypertree decompositions (HDs) and hypertree width (HW) may be used. HDs are GHDs that fulfil an additional technical condition. The HW HW(Q) of a conjunctive query Q (e.g. of the query associated with a rule body of an Existential Datalog rule) is the smallest integer i such that Q has a HD of with i. As shown in the literature, for each constant k the following problems are tractable, and there are well-known algorithms for their solution: (i) check whether a CQ Q has hypertree width HW(Q)≤k, and if this is the case (ii) compute HW(Q) and compute a HD of Q of width HW(Q). In practice, the overwhelming number of CQs Q have HW(Q)<4. Therefore, a good heuristic would be to use this optimization technique only with the upper bound 3 for the HW of CQs corresponding to rule bodies.

Stratified Negation

The most common approach to integrate Negation in Datalog is via the so-called stratified negation. Recall the notion of stratification from the "Datalog" section herein. Intuitively, the use of negation is restricted in such a way, that no relation is defined recursively involving it's own negation. The following simple EE-Datalog program is stratified, and examplifies the usage of the negation operator "not" next to the to be negated r(X, Y). Also recall, that the following program is safe, as both variables, "X" and "Y", occurring in the negated atom, also occur individually in the non-negated atom q(X), resp. q(Y).

p(X):—q(X), q(Y), not r(X,Y);

To compute p from q and r, in a relational setting, one does first compute the cross-product on q with q, and then keeps only those tuples which are not in r. The latter is referred to as anti-join. For example, consider q={"a", "b"}, and r={("a","b"),("b","a")}. Then, the cross-product q'=q×q, yields q'={("a", "a"), ("a", "b"), ("b", "a"), ("b", "b")}. Consequently, the anti-join of q' with r will yield {("a","a"),("b", "b")}.

Differential dataflow provides an antijoin-operator. The following code examplifies, how to realize the above rule, as chain of differential dataflow operators.

let p=q
   .map(|(x)| (( ), (x)))
   .join(&q.map(|(x)| (( ), (x))))
   .map(|(key, value)| value)
   .antijoin(&r)
   .map(|(x, Y)|(x));

Assuming a declared input collection q, the first application of the map-operator in the second line maps the single element to a key-value pair (O, (x)) having an empty key. In the third line, an ordinary join-operator application is used to realize the cross-product, where the argument is again the same map-operator application on q, yielding the key-value pair with empty key. From the resulting key-value pairs, the key component is projected away, such that eventually the antijoin-operator can be applied on the result. Finally, in the last line the map-operator realizes the projection of the head of the rule, projecting on X, dropping Y.

Program Analysis and Termination Guarantees

As already discussed, the problem of whether for an Existential Datalog program P over a database D, Chase(D, P) contains a finite or infinite amount of atoms (and thus will or will not terminate) is in general undecidable, but there exist syntactic classes of programs for which termination is guaranteed, and others, for which query-answering requires only a finite number of levels of the level-saturating Chase.

It is possible to implement another embodiment that extends the disclosed translation methods.

For an input program P, this can work as follows. (i) Check with existing algorithms whether the input Existential Datalog program fulfils the super-weak acyclicity property which guarantees Chase termination. If this is the case, then implement the (level-saturating) Chase normally, as it will terminate by itself. (ii) Otherwise, check (using existing methods) if P satisfies weak frontier-guardedness. If so, add to the code implementing the Chase a mechanism for dynamically determining during the computation of Chase (D,P), for each database D, the depth wgdepth(C,D,P) for each atom C generated by Chase(D,P). Obtain an upper bound k for the query size sz(Q), either from the program P itself in case it contains a maximum query size declaration such as "maxqsz(k)", or, in absence of this, via a user interface from a user. Modify the level-saturating Chase so that (the translation of) a rule ρ with guard G does not fire with any substitution θ where wgdepth(θ(G))>k x $f_{wg}$(D,P), thereby blocking and terminating the level-saturating Chase computation at a sufficiently deep level so that the resulting finite database constituted by this initial fragment of Chase (D,P), which is $Chase_{wg}^{k \times f_{wg}(D,P)}$(D,P), is sufficient for correctly answering conjunctive queries of size at most k.

To stop the Chase, the code resulting from the translation may contain for each a-ary predicate r of P an a +1-ary relation (or collection) r. The last column of this relation would be an integer indicating for each tuple its weakly-guarded depth (wgdepth). Thus, an atom $A = r(t_1, \ldots, t_m)$ with wgdepth(A)=i, that would normally be generated with this chase now is computed and stored as $r(t_1, \ldots, t_m, i)$. The code translating a rule ρ of P now just needs to be extended by code that adds as last argument of the new fact to be generated the integer j+1, when the weak guard of ρ has as last argument j. This way, the weakly-guarded depth wgdepth is computed dynamically, and by adding to the translation of ρ for each body atom B of ρ a constraint that the last argument of B must be smaller than a required bound (e.g. $k \times f_{wg}(D, P)-1$ for some maximum query size k), it is ensured that the Chase is cut off at the desired weakly-guarded depth.

Typed and Type-Checked Existential Datalog Via Type-Inference

A very useful syntactic and semantic extension to Existential Datalog is to introduce additional data types of which one can be assigned to the columns of a relation. Enforcing typed EDB relations then have general strongly typed Existential Datalog programs as consequence. That is, for all relations (EDB and IDB), the types of their columns must be known before the evaluation starts. This can be explained by using the EE-Deltalog version of Existential Datalog, as an example. The principles disclosed here can be applied (or adapted) to many other variants of Existential Datalog and their extensions.

The advantage of more types, and strongly typed EE-Deltalog programs are manifold:

More types enable to support more use cases, by encapsulating data within compound types.

Type-checking increases the reliability of an EE-Deltalog program to be correct and less error-prone.

Ease data integration, for example, reading or writing from a relational database would not require one to restrict only to certain types, but fully support each data type also offered in the database of interest.

Strongly typed programs can be achieved in two ways:

Types are explicitly given as syntactic part of each atom, or, preferably, types are merely given for each EDB relation, and the column types for IDB relations are automatically inferred by some type-inference mechanism.

Consider the following example, where in line one the only EDB relation "connection" is explicitly declared as input (EDB) relation, equipped with the schema (str, str, i32), meaning that "connection" has three columns, the first two are of type string ("str"), and the last column is of integer type ("i32").

input connection (str, str, i32);
reachable(X, Y, D):—connection (X, Y, D);
reachable(X, Y, D1+D2):—reachable(X, Z, D1), connection (Z, Y, D2);

Then, from the known schema of the "connection" relation, it is possible to derive the types in the schema of the IDB relation "reachable". For example, considering the rule in the second line of code, the type of each variable X, Y, and D is known directly from the given schema in the input statement, and therefore the schema of the "reachable" relation equals the one of "connection".

It can be important to also check for consistent type usage. For example, it should not be the case that in contrast to the second line in the code, the schema derived for the "reachable" relation in the third line of code is different. This is referred to as type-checking. An algorithm with which both can be realized is, for example, the Martelli-Montanari unification algorithm. Any EE-Deltalog program with a type mismatch detected, would be reported with an error. In order to apply the Martelli-Montanari-algorithm on a given EE-Deltalog program, one must extract an equation system, which is then solved by the algorithm and the derived types can be extracted from the solved form of the equation system. In case of incompatible types, the algorithm would stop and the input EE-Deltalog would be rejected.

The system may include a computing system, which can be for example any computing device, or any component thereof in which the components of the system are in communication with each other using a connection. The connection can be a physical connection via a bus, or a direct connection into a processor, such as in a chipset architecture. The connection can also be a virtual connection, networked connection, or logical connection.

In some embodiments, the computing system is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

The example system includes at least one processing unit (CPU or processor) and the connection that couples various system components including system memory, such as read-only memory (ROM) and random access memory (RAM) to the processor. The computing system can include a cache of high-speed memory connected directly with, in close proximity to, or integrated as part of the processor.

The processor can include any general purpose processor and a hardware service or software service, such as services stored in storage device, configured to control the processor as well as a special-purpose processor where software instructions are incorporated into the actual processor design. The processor may essentially be a completely self-contained computing system, containing multiple cores or processors, a bus, memory controller, cache, etc. A multi-core processor may be symmetric or asymmetric.

To enable user interaction, the computing system includes an input device, which can represent any number of input mechanisms, such as a microphone for speech, a touch-sensitive screen for gesture or graphical input, keyboard, mouse, motion input, speech, etc. The computing system can also include an output device, which can be one or more of a number of output mechanisms known to those of skill in the art.

In some instances, multimodal systems can enable a user to provide multiple types of input/output to communicate with the computing system. The computing system can include a communications interface, which can generally govern and manage the user input and system output. There is no restriction on operating on any particular hardware arrangement, and therefore the basic features here may easily be substituted for improved hardware or firmware arrangements as they are developed.

A storage device can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device can include software services, servers, services, etc., that when the code that defines such software is executed by the processor, it causes the system to perform a function. In some embodiments, a hardware service that performs a particular function can include the software component stored in a computer-readable medium in connection with the necessary hardware components, such as the processor, the connection, the output device, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A method of converting Existential Datalog source code P into Differential Dataflow source code comprising:
   (i) accessing, by at least one processor, Existential Datalog source code P from one of electronic storage and via user input; and
   (ii) converting, by the at least one processor, the Existential Datalog source code P into code of a target language augmented by Differential Dataflow constructs and operators, the converting producing code that, when executed on an extensional database D determines "Chase(D,P)" of a fair Chase procedure to D and P, thereby determining a materialization of a knowledge graph (D,P) formed by D and P,
   whereby, upon a normal termination of a computation of Trans(P) on input D, the determined Chase(D,P) enables a computation of solutions to (i) instances of the Query of Tuple problem (ii) instances of the Conjunctive Query Answering problem, and (iii) instances of the Certain Tuple Computation Problem.

2. The method of claim 1, wherein either the converting is performed by a compiler, or the converting is performed by an interpreter.

3. The method of claim 1, wherein for Existential Datalog source code P1 of a particular class C1, the method further comprising, executing a pre-processing that transforms each source code P1 of class C1 that is not already in C2 into source code P2 of a particular class C2, such that P2 is equivalent to P1 with regard to an intended application context.

4. The method of claim 3, where C1 is a class of Existential Datalog source code where more than two regular atoms are allowed to jointly occur in a rule body and where C2 is a subclass of C1 where at most two regular atoms per rule are allowed to jointly occur in rule bodies, and where the pre-processing further comprises: starting with source code P1, until no rule body has more than two regular atoms, systematically replaces conjunctions of pairs of regular atoms A and B that occur in a rule body by a single auxiliary atom C whose predicate symbol is newly created, and for each such replacement adds a new rule whose head is C and whose body is the conjunction of A and B, and where the arguments of C are the variables of A and B, each variable occurring only once in C.

5. The method of claim 3, further comprising at least one of:
   (i) inserting additional application code written in an augmented target language into appropriate places of Trans(P), (ii) linking application code to Trans(P), and (iii) embedding Trans(P) in application code, whereby Trans(P) is used together with application code that further processes at least some of the IDB relations, including the relations computed by Trans(P) corresponding to intensional database predicates (IDB predicates) of P, and other data when Trans(P) is executed over an extensional database (EDB).

6. The method of claim 1, wherein Trans(P) comprises:
   (i) appropriate declarations and initializations of variables, and
   (ii) code generating fresh null values, and
   (iii) for each rule of P, or of a pre-processed version of P, code for executing the rule ("Rule Execution Code"), the code comprising a composition of Differential Dataflow operations applied to data relations that correspond to predicates occurring in the body of the rule, such that the Rule Execution Code during the computation for some database D of Chase(D,P) by Trans(P), for each application of the rule, generates for each existential variable Z in the rule head a fresh null value to replace Z in the new atom generated by the rule application.

7. The method of claim 6, wherein the code generating fresh null values is implemented by at least one of:
   (i) using a counter initially set to zero or to another initial value, where a current value of the counter determines a form of a fresh null to be generated, and where the counter is incremented with every generation of a fresh null value,
   (ii) using Skolem functions to form Skolem terms,
   (iii) using a hash or compression function, and
   (iv) using a random number generator.

8. The method of claim 6, wherein Trans(P) comprises a Differential Dataflow "iterative" loop to compute a value of IDB relations corresponding to predicates of P.

9. The method of claim 8, wherein Trans(P) comprises a single iterative loop for evaluating all IDB relations corresponding to recursive predicates of P within the loop.

10. The method of claim 8, wherein Trans(P) comprises a single iterative loop, and the code for evaluating all IDB relations of P is within the loop.

11. The method of claim 8, wherein Trans(P) comprises multiple iterative loops, and code for evaluating each of the IDB relations corresponding to recursive predicates of P is distributed over the multiple iterative loops.

12. The method of claim 8, wherein each IDB relation r to be computed inside an iterative loop, comprises:
   (i) a chain of Differential Dataflow concatenations using the Differential Dataflow concat-operator,
   (i) the first element of the chain corresponds to an empty instance of r,
   (i) to the first element, a Rule Execution Code of each rule of P having a head predicate is r is concatenated, and
   (i) to eliminate duplicates, the commands "consolidate( )" and "distinct( )" are appended to a chain of concatenations.

13. The method of claim 8, wherein the Rule Execution Code of each rule comprises:
   (i) a first part comprising:
      (a) reflecting an effect of occurrences of constants and multiple occurrences of a same variable in regular body atoms of the rule by using Differential Dataflow filter-operators,
      (b) reflecting an effect of multiple regular atoms in rule bodies by using Differential Dataflow join-operators,
      where, in addition, Differential Dataflow map-operators are used for schema-conversions,
   (ii) a second part comprising reflecting an effect of constraints imposed by comparison atoms in a rule body by appropriate Differential Dataflow filter-operators, and
   (iii) a third part comprising expressing output of a rule application, comprising a new atom A that is an instance of a rule's head atom, by using an appropriate target language construct for, where, for each existential variable Z in a rule head, the construct uses code for generating a fresh null value, to be inserted into A at same argument positions where Z occurs in the rule head.

14. The method of claim 13 wherein when there is a single iterative loop, and the Rule Execution Code of each rule occurs within the single iterative loop, and computation performed by the single iterative loop corresponds to an execution of a level-saturating Chase.

15. The method of claim 14, wherein schema conversions are used to structure schemas of join operands into key-value pairs for Differential Dataflow join-operators and for re-converting structured schemas of join results to unstructured schemas.

16. The method of claim 15, wherein the fresh null value for each existential variable Z for each application of the rule is generated by using and incrementing a null-counter.

17. The method of claim 16, wherein a target language is Rust, and where a Differential Dataflow map-operator for specifying output of the rule, in case of an existential variable Z in the rule head, comprises the Rust "move" keyword and code for assigning the current value of the null-counter as null-value to Z and for incrementing the null-counter.

18. The method of claim 6 further comprising:
   (i) the converting from P to Trans(P) comprises first analyzing P, and
   (ii) if the P is not recognized to be in a class that guarantees Chase termination for each input database, but P is recognized to belong to a class for which an initial fragment of Chase(D,B) enables solving at least one particular given problem, the converting produces code Trans(P) that computes an initial fragment of Chase(D,P) enabling the solving of the at least one given problem.

19. The method of claim 6, further comprising conjunctive query answering comprising:
   (i) the source code P comprising a declaration specifying a maximum size k for conjunctive queries to be answered,
   (ii) the converting from P to Trans(P) first analyzing whether P is super-weakly acyclic, and if not, analyzing whether P is weakly frontier-guarded,
   (iii) if P is super-weakly Trans(P), for each input database D, determining a finite set (or database) Chase(D,P),
   (iv) if P is not super-weakly acyclic but is weakly frontier-guarded, Trans(P), on each input database D computing an initial fragment of Chase(D,P) by enhancing a level-saturating Chase computation comprising:
      (a) determining for each generated tuple or atom A the weakly-guarded depth wgdepth(A), and
      (b) inhibiting via inequalities in the Rule Execution Code corresponding to rules of P that for any input database D, tuples or atoms A are generated for which wgdepth(A)>k×$f_{wg}$(D,P).

20. The method of claim 6 further comprising implementation of computation of Chase(D,P) and:

(a) type checking and type inference,
(b) connecting Trans(P) to a streaming middleware and obtaining an extensional database (EDB) in form of a data stream of insert and delete commands and/or pushing output data as a stream through the middleware to external application software,
(c) maintaining an external database by receiving an EDB in form of a stream of insert and delete commands, and updating the external database comprising relations corresponding to intensional predicates of P via a stream of insert and delete commands,
(d) using and processing stratified negation in rule bodies implemented via the Differential Dataflow antijoin operator,
(e) query optimization via logical and physical optimization methods,
(f) query optimization using hypertree decompositions or generalized hypertree decompositions,
(g) external function calls, and
(h) use of Existential Datalog with non-recursive aggregate functions.

21. A system to convert Existential Datalog source code P into Differential Dataflow source code comprising: a memory storing computer-readable instructions and at least one processor to execute the instructions to:
    (i) access Existential Datalog source code P from one of electronic storage and via user input; and
    (ii) convert the Existential Datalog source code P into code of a target language augmented by Differential Dataflow constructs and operators, to produce code that, when executed on an extensional database D determines "Chase(D,P)" of a fair Chase procedure to D and P, and determines a materialization of a knowledge graph (D,P) formed by D and P,
whereby, upon a normal termination of a computation of Trans(P) on input D, the determined Chase(D,P) enables a computation of solutions to (i) instances of the Query of Tuple problem (ii) instances of the Conjunctive Query Answering problem, and (iii) instances of the Certain Tuple Computation Problem.

22. A non-transitory computer-readable storage medium comprising instructions stored thereon that, when executed by a computing device cause the computing device to perform operations of converting Existential Datalog source code P into Differential Dataflow source code, the operations comprising:
    (i) accessing Existential Datalog source code P from one of electronic storage and via user input; and
    (ii) converting the Existential Datalog source code P into code of a target language augmented by Differential Dataflow constructs and operators, the converting producing code that, when executed on an extensional database D determines "Chase(D,P)" of a fair Chase procedure to D and P, thereby determining a materialization of a knowledge graph (D,P) formed by D and P,
whereby, upon a normal termination of a computation of Trans(P) on input D, the determined Chase(D,P) enables a computation of solutions to (i) instances of the Query of Tuple problem (ii) instances of the Conjunctive Query Answering problem, and (iii) instances of the Certain Tuple Computation Problem.

* * * * *